United States Patent
Kawai

(10) Patent No.: US 9,560,243 B2
(45) Date of Patent: Jan. 31, 2017

(54) IMAGE PROCESSING DEVICE, IMAGING DEVICE, PROGRAM, AND IMAGE PROCESSING METHOD SUPPRESSING A REDUCTION IN VISIBILITY OF AN IMAGE TO CHECK FOCUS WHEN DISTORTION IS CORRECTED

(71) Applicant: FUJIFILM Corporation, Tokyo (JP)

(72) Inventor: Tomoyuki Kawai, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/753,406

(22) Filed: Jun. 29, 2015

(65) Prior Publication Data

US 2015/0304529 A1 Oct. 22, 2015

Related U.S. Application Data

(63) Continuation of application No. PCT/JP2013/084433, filed on Dec. 24, 2013.

(30) Foreign Application Priority Data

Jan. 4, 2013 (JP) ................................. 2013-000044

(51) Int. Cl.
*H04N 5/217* (2011.01)
*H04N 5/262* (2006.01)
(Continued)

(52) U.S. Cl.
CPC ........ *H04N 5/21* (2013.01); *G02B 7/34* (2013.01); *H04N 5/225* (2013.01); *H04N 5/232* (2013.01);
(Continued)

(58) Field of Classification Search
CPC .. H04N 5/2173; H04N 5/2628; H04N 5/23296; H04N 5/3696; H04N 5/23293; H04N 5/225; H04N 5/232; H04N 2101/00; H04N 9/04; H04N 5/23212; G02B 7/34
See application file for complete search history.

(56) References Cited

U.S. PATENT DOCUMENTS

2005/0191047 A1* 9/2005 Toji .................... H04N 5/23212 396/111
2009/0153693 A1* 6/2009 Onuki ................ H04N 5/23212 348/222.1

(Continued)

FOREIGN PATENT DOCUMENTS

JP 2009-147665 A 7/2009
JP 2010-191390 A 9/2010

OTHER PUBLICATIONS

International Search Report, issued in PCT/JP2013/084433, dated Mar. 11, 2014.

(Continued)

*Primary Examiner* — Albert Cutler
(74) *Attorney, Agent, or Firm* — Birch, Stewart, Kolasch & Birch, LLP

(57) ABSTRACT

Provided are an image processing device, an imaging device, a program, and an image processing method which can suppress a reduction in the visibility of a split image when distortion is corrected. A first display image which is used as a live view image and a second display image which is used to check a focus are generated on the basis of an image signal output from an imaging element including first and second pixel groups on which an object image that passes through first and second regions of an imaging lens and is pupil-divided is formed (S403, S415). The distortion of the first display image is corrected (S403, S411). The distortion of the second display image in a division direction (Continued)

is corrected and distortion in a direction orthogonal to the division direction is not corrected (S409, S417).

17 Claims, 34 Drawing Sheets

(51) Int. Cl.
    *H04N 5/232*     (2006.01)
    *H04N 5/369*     (2011.01)
    *H04N 5/225*     (2006.01)
    *G02B 7/34*     (2006.01)
    *H04N 101/00*     (2006.01)
    *H04N 9/04*     (2006.01)
    *H04N 5/21*     (2006.01)

(52) U.S. Cl.
    CPC ...... *H04N 5/23293* (2013.01); *H04N 5/23296* (2013.01); *H04N 5/2628* (2013.01); *H04N 5/3696* (2013.01); *H04N 5/23212* (2013.01); *H04N 9/04* (2013.01); *H04N 2101/00* (2013.01)

(56) References Cited

U.S. PATENT DOCUMENTS

| | | | |
|---|---|---|---|
| 2011/0025904 A1* | 2/2011 | Onuki | G02B 7/34 348/360 |
| 2011/0317042 A1* | 12/2011 | Goto | G02B 7/346 348/241 |
| 2012/0147227 A1* | 6/2012 | Yoshimura | G02B 7/346 348/246 |

OTHER PUBLICATIONS

Written Opinion of the International Searching Authority, issued in PCT/JP2013/084433, dated Mar. 11, 2014.

* cited by examiner

FIG. 4

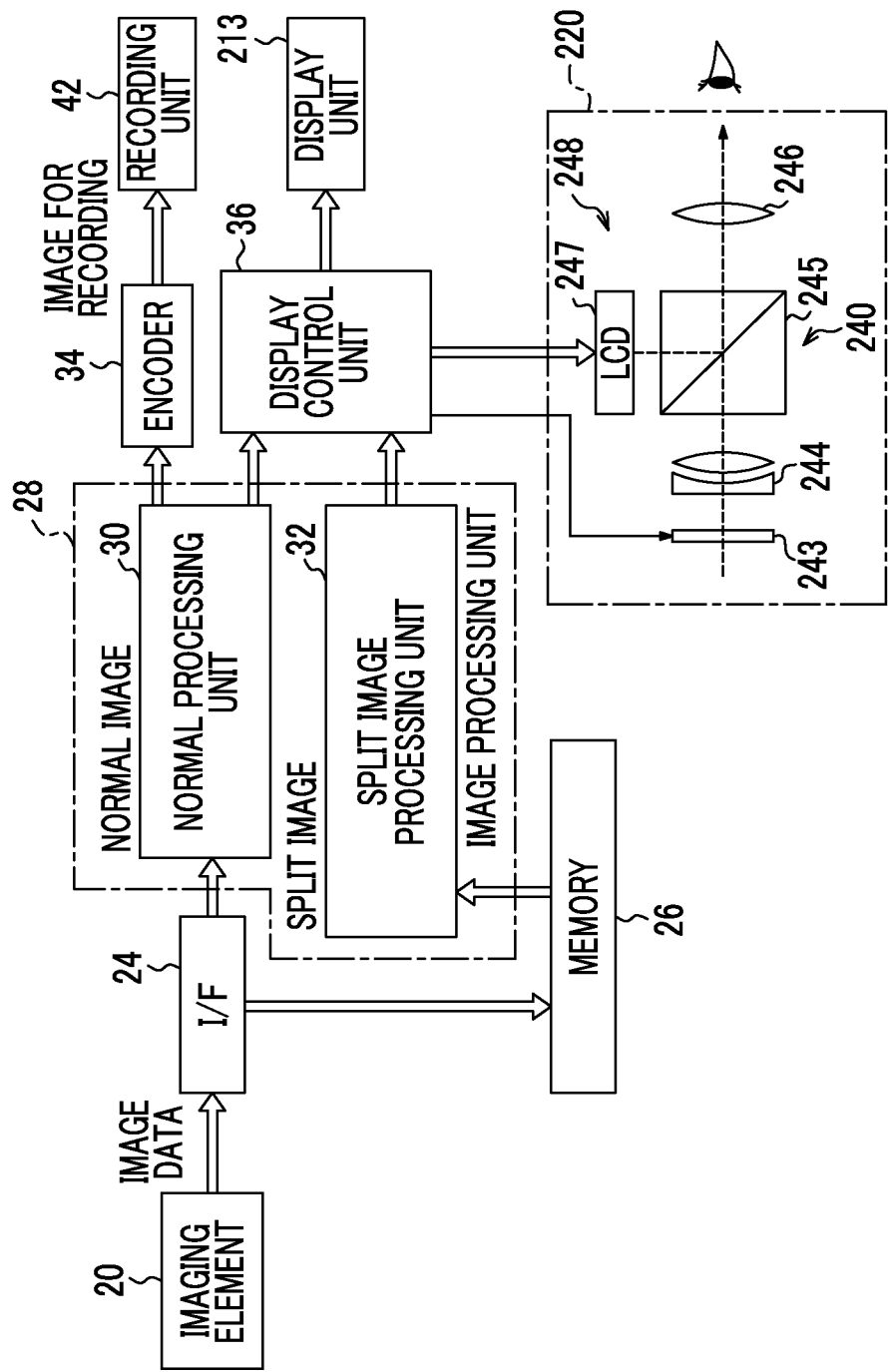

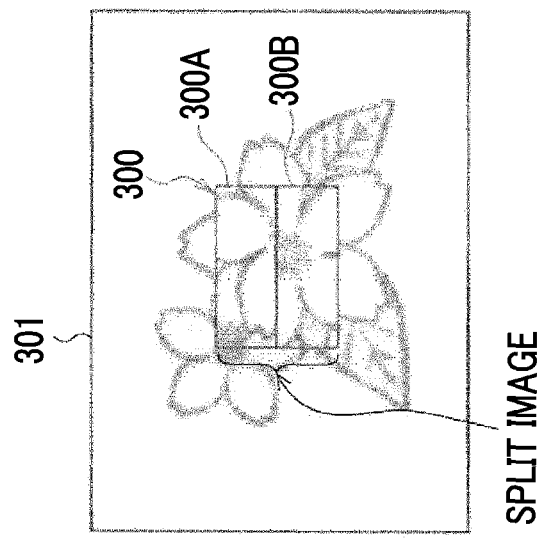

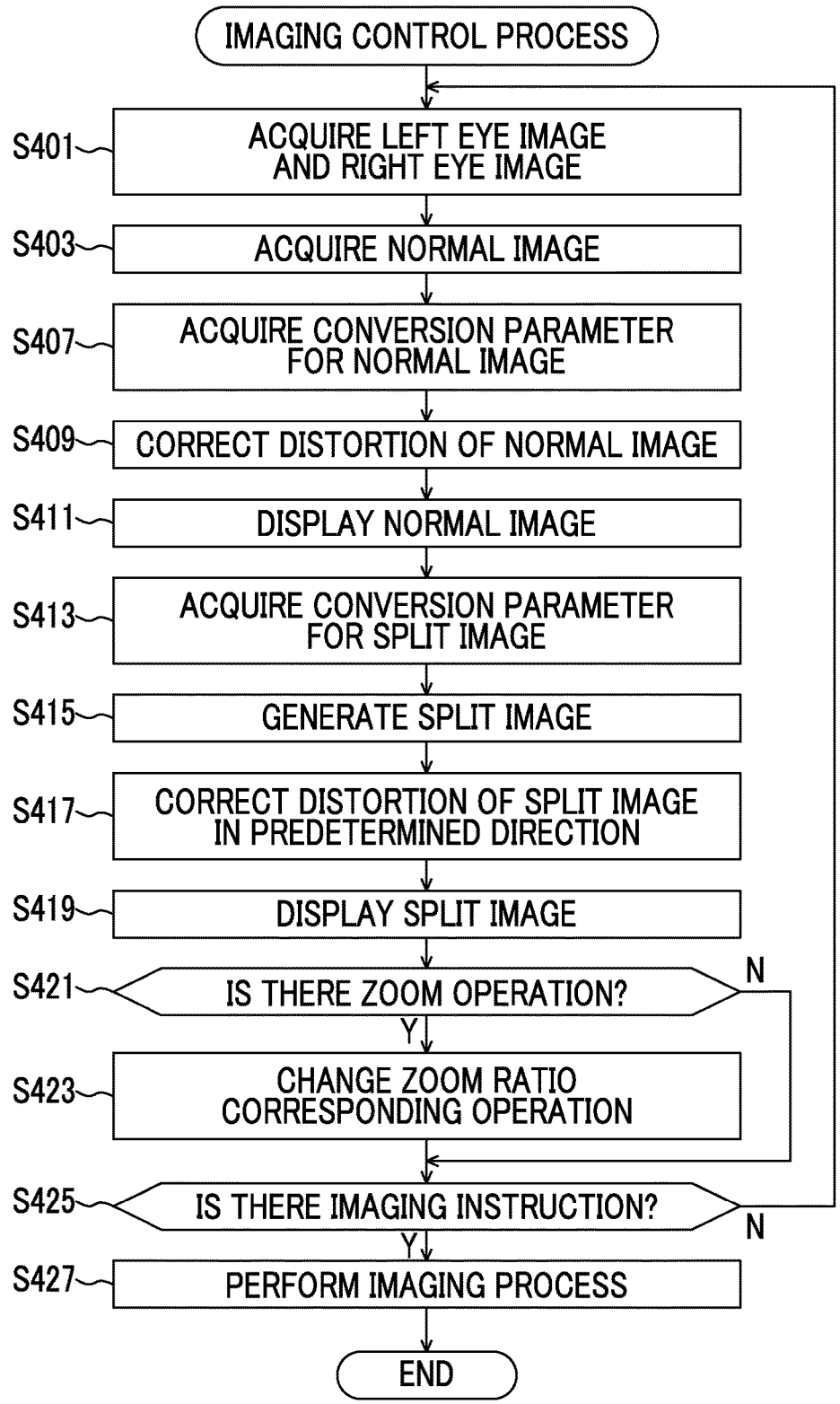

IMAGE PROCESSING DEVICE, IMAGING DEVICE, PROGRAM, AND IMAGE PROCESSING METHOD SUPPRESSING A REDUCTION IN VISIBILITY OF AN IMAGE TO CHECK FOCUS WHEN DISTORTION IS CORRECTED

CROSS REFERENCE TO RELATED APPLICATIONS

This application is a Continuation of PCT International Application No. PCT/JP2013/084433 filed on Dec. 24, 2013, which claims priority under 35 U.S.C §119(a) to Japanese Patent Application No. 2013-000044 filed on Jan. 4, 2013, all of which are hereby expressly incorporated by reference into the present application.

BACKGROUND OF THE INVENTION

1. Field of the Invention

The present invention relates to an image processing device, an imaging device, a program, and an image processing method, and more particularly, to an image processing device, an imaging device, a non-transitory recording medium storing a program, and an image processing method which generate an image for checking the focus state of an object image and display the image.

2. Description of the Related Art

In recent years, a technique has been used which displays a split image in a live view image (so-called through image) in order to facilitate a manual focus adjustment operation in an imaging device, such as a digital camera or a mobile phone with a camera. The split image is an image obtained by combining a portion of a left eye image and a portion of a right eye image corresponding to a predetermined region of an object image. In the split image, the deviation between the left eye image and the right eye image occurs in a direction in which parallax occurs according to a focus state. This technique makes it possible for the user to check the deviation between the left eye image and the right eye image in the split image and to check the focus state.

As a technique related to the above, JP2009-147665A discloses an imaging device which generates a split image using signals obtained from pupil-divided imaging pixels. When displaying the split image, the imaging device adds the color information of signals obtained from the imaging pixels which are not pupil-divided to a left eye image and a right eye image and displays a chromatic split image.

Distortion caused by an imaging lens occurs in an object image which is formed on an imaging element through the imaging lens. Therefore, in the imaging device according to the related art, a process for correcting the distortion is performed.

However, when the distortion correction process is performed on a signal obtained from a normal imaging pixel, the accuracy of detecting a focus is reduced in automatic focus control.

JP2010-191390A discloses an imaging device which suppresses a reduction in the accuracy of detecting a focus in automatic focus control even when the distortion is corrected. The imaging device separately performs the distortion correction process on a signal obtained from a normal imaging pixel and a signal obtained from a pixel for automatic focus control to suppress a reduction in the accuracy of detecting the focus.

SUMMARY OF THE INVENTION

However, in the imaging device, when the split image is displayed, distortion occurs in the split image as in the normal image.

Applying the techniques disclosed in JP2009-147665A and JP2010-191390A in order to correct the distortion of the split image may be considered. That is, separately performing the distortion correction process on a signal obtained from a normal imaging pixel and a signal obtained from a pixel for a split image may be considered.

It is preferable that the interface between the right eye image and the left eye image is a straight line in terms of visibility in order for the user to visually check the amount of deviation between the right eye image and the left eye image in the split image. Therefore, the right eye image and the left eye image in the split image are combined with each other such that the interface therebetween is a straight line. However, when the techniques disclosed in JP2009-147665A and JP2010-191390A are applied, the interface is distorted according to the amount of distortion and the visibility of the split image is reduced.

The invention has been made in view of the above-mentioned problems and an object of the invention is to provide an image processing device, an imaging device, a non-transitory recording medium storing a program, and an image processing method which can suppress a reduction in the visibility of a focus check image (split image) when distortion is corrected.

In order to achieve the object, according to an aspect of the invention, there is provided an image processing device including: a generation unit that generates a first display image on the basis of an image signal output from an imaging element including first and second pixel groups on which an object image that passes through first and second regions of an imaging lens and is pupil-divided is formed, and generates, on the basis of first and second images based on image signals output from the first and second pixel groups, a second display image that is used to check a focus and includes a first divided image which is a portion of a plurality of divided images obtained by dividing the first image in a predetermined division direction and a second divided image which is a portion of a plurality of divided images obtained by dividing the second image in the division direction and is arranged in a divided region other than a divided region corresponding to the first divided image; a display unit that displays an image; a display control unit that controls the display unit such that the first display image generated by the generation unit is displayed and the second display image generated by the generation unit is displayed in a display region of the first display image; and a correction unit that corrects distortion of the first display image caused by the imaging lens, corrects distortion of the second display image in the division direction, and does not correct the distortion of the second display image in a direction orthogonal to the division direction.

According to the image processing device of the above-mentioned aspect of the invention, the generation unit generates the first display image on the basis of the image signal output from the imaging element including the first and second pixel groups on which the object image that has passed through the first and second regions of the imaging lens and has been pupil-divided is formed.

In addition, in the above-mentioned aspect of the invention, the generation unit generates the second display image that is used to check the focus and includes the first divided image which is a portion of the plurality of divided images obtained by dividing the first image in the predetermined division direction and the second divided image which is a portion of the plurality of divided images obtained by dividing the second image in the division direction and is arranged in the divided region other than the divided region corresponding to the first divided image, on the basis of the first and second images based on the image signals output from the first and second pixel groups.

In the above-mentioned aspect of the invention, the display control unit controls the display unit such that the first display image generated by the generation unit is displayed and the second display image generated by the generation unit is displayed in the display region of the first display image.

In the above-mentioned aspect of the invention, the correction unit corrects the distortion of the first display image caused by the imaging lens, corrects the distortion of the second display image in the division direction, and does not correct the distortion of the second display image in a direction orthogonal to the division direction.

As such, the image processing device according to the above-mentioned aspect of the invention corrects the distortion of the second display image (split image) in the orthogonal direction using the same method as that used for the first display image (normal image). Therefore, the deviation between the second display image and the normal image in the orthogonal direction is prevented. As a result, it is possible to suppress a reduction in the visibility of the second display image when distortion is corrected.

In order to achieve the object, according to a second aspect of the invention, there is provided an image processing device including: a generation unit that generates a first display image on the basis of an image signal output from an imaging element including first and second pixel groups on which an object image that passes through first and second regions of an imaging lens and is pupil-divided is formed, and generates, on the basis of first and second images based on image signals output from the first and second pixel groups, a second display image that is used to check a focus and includes a first divided image which is a portion of a plurality of divided images obtained by dividing the first image in a predetermined division direction and a second divided image which is a portion of a plurality of divided images obtained by dividing the second image in the division direction and is arranged in a divided region other than a divided region corresponding to the first divided image; a display unit that displays an image; a display control unit that suppresses the display of the first display image generated by the generation unit by the display unit and controls the display unit such that the second display image generated by the generation unit is displayed; and a correction unit that corrects distortion of the first display image caused by the imaging lens, corrects distortion of the second display image in the division direction, and does not correct the distortion of the second display image in a direction orthogonal to the division direction.

According to the image processing device of the second aspect of the invention, the generation unit generates the first display image on the basis of the image signal output from the imaging element including the first and second pixel groups on which the object image that has passed through the first and second regions of the imaging lens and has been pupil-divided is formed.

In addition, in the second aspect of the invention, the generation unit generates the second display image that is used to check the focus and includes the first divided image which is a portion of the plurality of divided images obtained by dividing the first image in the predetermined division direction and the second divided image which is a portion of the plurality of divided images obtained by dividing the second image in the division direction and is arranged in the divided region other than the divided region corresponding to the first divided image, on the basis of the first and second images based on the image signals output from the first and second pixel groups.

In the image processing device according to the second aspect of the invention, the display control unit suppresses the display of the first display image generated by the generation unit by the display unit and controls the display unit such that the second display image generated by the generation unit is displayed.

In the second aspect of the invention, the correction unit corrects the distortion of the first display image caused by the imaging lens, corrects the distortion of the second display image in the division direction, and does not correct the distortion of the second display image in the direction orthogonal to the division direction.

As such, the image processing device according to the second aspect of the invention corrects the distortion of the second display image in the orthogonal direction using the same method as that used for the first display image. Therefore, the deviation between the second display image and the normal image in the orthogonal direction is prevented. As a result, it is possible to suppress a reduction in the visibility of the second display image when distortion is corrected.

In the image processing device according to the above-mentioned aspects of the invention, the imaging lens may be a zoom lens and the correction unit may correct the distortion according to a focal length of the zoom lens. According to this structure, even when the imaging lens is a zoom lens, it is possible to appropriately correct distortion.

In the image processing device according to the above-mentioned aspects of the invention, the correction unit may correct the distortion according to an aperture value of the imaging lens. According to this structure, even when the aperture value is changed, it is possible to appropriately correct distortion.

The image processing device according to the above-mentioned aspects of the invention may further include: a mounting portion that is used to interchangeably mount any one of a plurality of the imaging lenses on a device body; and an acquisition unit that acquires information indicating the type of the imaging lens mounted by the mounting portion. The correction unit may correct the distortion according to the type of the imaging lens indicated by the information acquired by the acquisition unit. According to this structure, even when the imaging lens is interchanged, it is possible to appropriately correct distortion.

The image processing device according to the above-mentioned aspects of the invention may further include: a second mounting portion that is used to mount any one of a plurality of types of predetermined conversion lenses on a device body; and a second acquisition unit that acquires information indicating the type of conversion lens mounted by the second mounting portion. The correction unit may correct the distortion according to the type of conversion lens indicated by the information acquired by the second acquisition unit. According to this structure, even when the conversion lens is mounted, it is possible to appropriately correct distortion.

The image processing device according to the above-mentioned aspects of the invention may further include: a third mounting portion that is used to mount any one of a plurality of types of predetermined conversion lenses between the device body and the imaging lens which is interchangeably mounted or on an object side of the imaging lens which is interchangeably mounted; and a second acquisition unit that acquires information indicating the type of conversion lens mounted by the third mounting portion. The correction unit may correct the distortion according to the type of conversion lens indicated by the information acquired by the second acquisition unit. According to this structure, even when the conversion lens is mounted, it is possible to appropriately correct distortion.

The image processing device according to the above-mentioned aspects of the invention may further include a storage unit that stores conversion information related to coordinate conversion for correcting the distortion in advance. The correction unit may correct the distortion on the basis of the conversion information stored in the storage unit. According to this structure, it is possible to simply correct distortion, using the conversion information stored in advance.

The image processing device according to the above-mentioned aspects of the invention may further include: a storage unit that stores conversion information related to coordinate conversion for correcting the distortion of the first display image in advance; and a derivation unit that derives second conversion information related to coordinate conversion for correcting the distortion of the second display image from the conversion information stored in the storage unit. The correction unit may correct the distortion on the basis of the conversion information stored in the storage unit and the second conversion information derived by the derivation unit. According to this structure, it is not necessary to store information for correcting the distortion of the second display image in advance. Therefore, it is possible to reduce the storage capacity of the storage unit.

In the image processing device according to the above-mentioned aspects of the invention, the conversion information may be at least one of information indicating a coordinate conversion table in which the coordinates of a plurality of pixels before the distortion is corrected are associated with the coordinates of the plurality of pixels after the distortion is corrected and an arithmetic expression for converting the coordinates before the correction into the coordinates after the correction. According to this structure, when the coordinate conversion table is used as the conversion information, it is possible to correct distortion at a high speed, as compared to the case in which the arithmetic expression is used. When the arithmetic expression is used as the conversion information, it is possible to reduce the storage capacity of the storage unit, as compared to the case in which the coordinate conversion table is used.

In the image processing device according to the above-mentioned aspects of the invention, the display control unit may perform control such that the second display image is displayed in a central portion of the first display image in the division direction. According to this structure, the second display image can be displayed in the central portion in which the distortion caused by the imaging lens is the minimum. As a result, the interface between the first image and the second image in the second display image can be a straight line or can be close to a straight line.

In order to achieve the object, according to another aspect of the invention, there is provided an imaging device including the image processing device according to the above-mentioned aspects of the invention, the imaging lens, and the imaging element.

Therefore, the imaging device according to the above-mentioned aspect of the invention has the same operation as the image processing device according to the above-mentioned aspect of the invention. As a result, the imaging device can suppress a reduction in the visibility of the second display image when distortion is corrected, similarly to the image processing device according to the above-mentioned aspects of the invention.

In order to achieve the object, according to still another aspect of the invention, there is provided a non-transitory recording medium storing a program that causes a computer to function as: a generation unit that generates a first display image on the basis of an image signal output from an imaging element including first and second pixel groups on which an object image that passes through first and second regions of an imaging lens and is pupil-divided is formed, and generates, on the basis of first and second images based on image signals output from the first and second pixel groups, a second display image that is used to check a focus and includes a first divided image which is a portion of a plurality of divided images obtained by dividing the first image in a predetermined division direction and a second divided image which is a portion of a plurality of divided images obtained by dividing the second image in the division direction and is arranged in a divided region other than a divided region corresponding to the first divided image; a display control unit that controls a display unit that displays an image such that the first display image generated by the generation unit is displayed and the second display image generated by the generation unit is displayed in a display region of the first display image; and a correction unit that corrects distortion of the first display image caused by the imaging lens, corrects distortion of the second display image in the division direction, and does not correct the distortion of the second display image in a direction orthogonal to the division direction.

Therefore, since the program of the above-mentioned aspect of the invention causes the computer to have the same operation as the image processing device according to the above-mentioned aspects of the invention, it is possible to suppress a reduction in the visibility of the second display image when distortion is corrected, similarly to the image processing device according to the above-mentioned aspects of the invention.

In order to achieve the object, according to still another aspect of the invention, there is provided an image processing method including: a generation step of generating a first display image on the basis of an image signal output from an imaging element including first and second pixel groups on which an object image that passes through first and second regions of an imaging lens and is pupil-divided is formed, and generating, on the basis of first and second images based on image signals output from the first and second pixel groups, a second display image that is used to check a focus and includes a first divided image which is a portion of a plurality of divided images obtained by dividing the first image in a predetermined division direction and a second divided image which is a portion of a plurality of divided images obtained by dividing the second image in the division direction and is arranged in a divided region other than a divided region corresponding to the first divided image; a display control step of controlling a display unit that displays an image such that the first display image generated in the generation step is displayed and the second display image generated in the generation step is displayed in a display region of the first display image; and a correction step of correcting distortion of the first display image caused by the imaging lens, correcting distortion of the second display image in the division direction, and not correcting distortion in a direction orthogonal to the division direction.

Therefore, since the image processing method according to the above-mentioned aspect of the invention has the same operation as the image processing device according to the above-mentioned aspects of the invention, it is possible to suppress a reduction in the visibility of the second display image when distortion is corrected, similarly to the image processing device according to the above-mentioned aspects of the invention.

According to the above-mentioned aspects of the invention, it is possible to suppress a reduction in the visibility of a focus check image (split image) when distortion is corrected.

BRIEF DESCRIPTION OF THE DRAWINGS

FIG. 4 is a schematic diagram illustrating an example of the arrangement of color filters and light shielding members in an imaging element of the imaging device according to the embodiment.

FIG. 6 is a block diagram illustrating an example of the functions of a main portion of the imaging device according to the embodiment.

FIG. 7A is a front view illustrating an example of the display aspect of a normal image and a split image according to the embodiment.

FIG. 9 is a flowchart illustrating the flow of the process of an imaging control processing program according to the first embodiment.

DESCRIPTION OF THE PREFERRED EMBODIMENTS

Hereinafter, examples of embodiments of an imaging device according to the invention will be described with reference to the accompanying drawings.

First Embodiment

Figure 1:
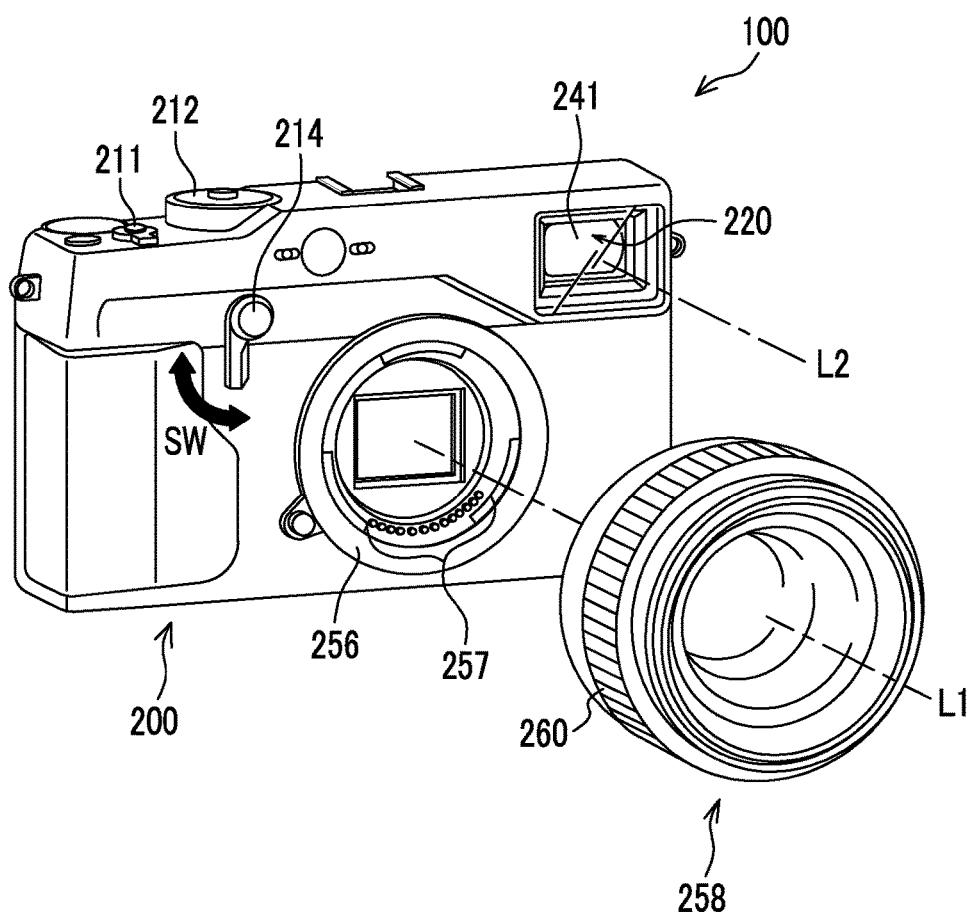
FIG. 1 is a perspective view illustrating an example of the outward appearance of an imaging device which is an interchangeable lens camera according to first to third embodiments.

An imaging device 100 according to this embodiment is an interchangeable lens camera. As illustrated in FIG. 1, the imaging device 100 is a digital camera that includes a camera body 200 and an interchangeable lens 258 (an imaging lens and a focus ring 260), which is a zoom lens interchangeably mounted on the camera body 200, and does not include a reflex mirror. In addition, a hybrid finder (registered trademark) 220 is provided in the camera body 200. The hybrid finder 220 means, for example, a finder in which an optical viewfinder (hereinafter, referred to as an "OVF") and an electronic viewfinder (hereinafter, referred to as an "EVF") are selectively used.

A mount 256 provided in the camera body 200 and a mount 346 (see FIG. 3) which is provided in the interchangeable lens 258 and corresponds to the mount 256 are coupled to each other such that the interchangeable lens 258 is interchangeably mounted on the camera body 200. In addition, the focus ring 260 is provided in a lens barrel of the interchangeable lens 258. In the imaging device 100, a focus lens is moved in an optical axis direction with the rotation of the focus ring 260 and object light can be focused on an imaging element 20 (see FIG. 3), which will be described below, at a focal position corresponding to the distance to the object (manual focusing).

A finder window 241 of the OVF included in the hybrid finder 220 is provided on the front surface of the camera body 200. In addition, a finder switching lever 214 is provided on the front surface of the camera body 200. When the finder switching lever 214 is rotated in the direction of an arrow SW, an image is switched between an optical image which can be viewed through the OVF and an electronic image (live view image) which can be viewed through the EVF, which will be described below. Further, an optical axis L2 of the OVF is different from an optical axis L1 of the interchangeable lens 258. Further, a release switch 211 and a dial 212 for setting, for example, an imaging mode or a reproduction mode are mainly provided on an upper surface of the camera body 200.

The release switch 211 is configured such that a two-stage pressing operation, that is, a state in which the release switch 211 is pressed from a standby position to an intermediate position (halfway pressed position) and a state in which the release switch 211 is pressed to a finally pressed position (fully pressed position) through the intermediate position can be detected. Hereinafter, the "state in which the release switch 211 is pressed from the standby position to the halfway pressed position" is referred to as a "halfway pressed state" and the "state in which the release switch 211 is pressed from the standby position to the fully pressed position" is referred to as a "fully pressed state". In the imaging device 100 according to the first embodiment, the state of the release switch 211 is changed to the halfway pressed state to perform an imaging control process, which will be described below. Then, the state of the release switch 211 is changed to the fully pressed state to perform exposure (imaging).

Figure 2:
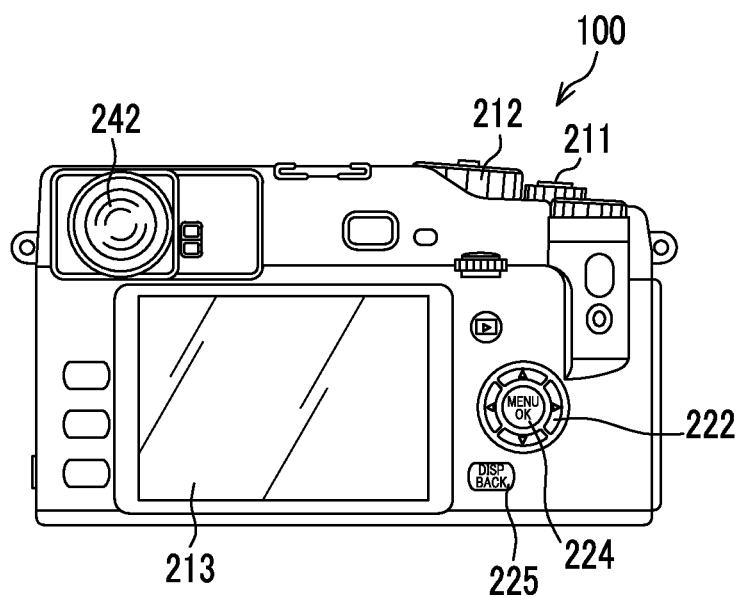
FIG. 2 is a rear view illustrating the rear surface side of the imaging device according to the first to third embodiments.

As illustrated in FIG. 2, a finder eyepiece 242 of the OVF, a display unit 213, a cross key 222, a MENU/OK key 224, and a BACK/DISP button 225 are provided on the rear surface of the camera body 200.

The cross key 222 functions as a multi-function key which is used to select a menu item and to output various kinds of command signals, such as a zoom signal and a frame advance signal. The MENU/OK key 224 is an operation key having both the function of a menu button for issuing a command to display a menu on a screen of the display unit 213 and the function of an OK button for issuing a command to confirm and execute the selected content. For example, the BACK/DISP button 225 is used to delete a desired target, such as a selected item, to cancel the designated content, or to return to the previous operation state.

The display unit 213 is implemented by, for example, an LCD and is used to display a live view image (through image) which is a continuous frame image captured in continuous frames in an imaging mode. In addition, the display unit 213 is used to display a still image which is an example of a single frame image that is captured in a single frame when an instruction to capture a still image is issued. The display unit 213 is also used to display a reproduction image in a reproduction mode or to display, for example, a menu screen.

Figure 3:
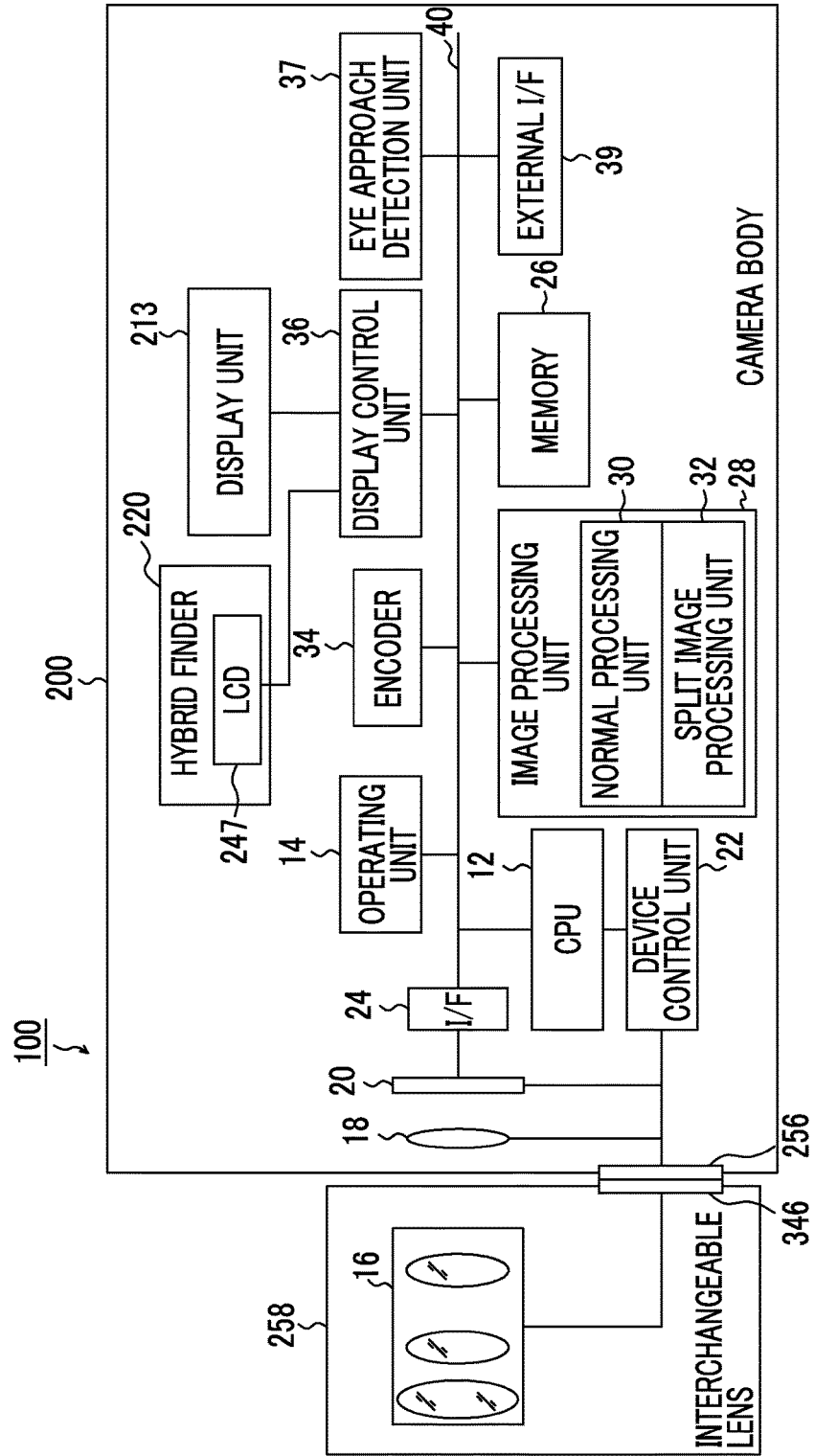
FIG. 3 is a block diagram illustrating an example of the structure of an electrical system of the imaging device according to the first to third embodiments.

The imaging device 100 is a digital camera that records the captured still image and moving image. The overall operation of the camera is controlled by a central processing unit (CPU) 12 illustrated in FIG. 3. As illustrated in FIG. 3, the imaging device 100 includes an operating unit 14, an interface unit 24, a memory 26, and an encoder 34, in addition to the CPU 12. In addition, the imaging device 100 includes a display control unit 36 which is an example of display control means according to the invention, an eye approach detection unit 37, and an external interface (I/F) 39. The imaging device 100 further includes an image processing unit 28 which is an example of generation means and parallax calculation means according to the invention.

The CPU 12, the operating unit 14, the interface unit 24, the memory 26, the image processing unit 28, the encoder 34, the display control unit 36, the eye approach detection unit 37, and the external interface (I/F) 39 are connected to each other through a bus 40. The memory 26 includes a non-volatile storage area (for example, an EEPROM) which stores, for example, parameters and programs and a volatile storage area (for example, an SDRAM) which temporarily stores, for example, various kinds of information of images.

In the imaging device 100 according to the first embodiment, the CPU 12 controls the driving of a focus adjustment motor such that the contrast value of the captured image is the maximum to perform focus control. In addition, the CPU 12 calculates AE information which is a physical amount indicating the brightness of the captured image. When the release switch 211 is in the halfway pressed state, the CPU 12 calculates a shutter speed and an F number corresponding to the brightness of the image indicated by the AE information. Then, the CPU 12 controls each related unit such that the shutter speed and the F number become the calculated values to set an exposure state.

The operating unit 14 is an user interface which is operated by the operator to input various instructions to the imaging device 100. Various instructions received by the operating unit 14 are input as operation signals to the CPU 12. The CPU 12 performs processes corresponding to the operation signals input from the operating unit 14.

The operating unit 14 includes the release switch 211, the dial 212, the display unit 213, the finder switching lever 214, the cross key 222, the MENU/OK key 224, and the BACK/DISP button 225.

When the imaging mode is set by the dial 212, image light indicating the object is focused on a light receiving surface of a color imaging element (for example, a CMOS sensor) 20 through a shutter 18 and an imaging lens 16 including a focus lens which can be moved by a manual operation. The signal charge stored in the imaging element 20 is sequentially read as a digital signal corresponding to the signal charge (voltage) by a read signal transmitted from the device control unit 22. The imaging element 20 has a so-called electronic shutter function and performs the electronic shutter function to control the charge storage time (shutter speed) of each photo sensor on the basis of the timing of the read signal. The imaging element 20 according to the first embodiment is a CMOS image sensor, but is not limited thereto. For example, the imaging element 20 may be a CCD image sensor.

Figure 4:
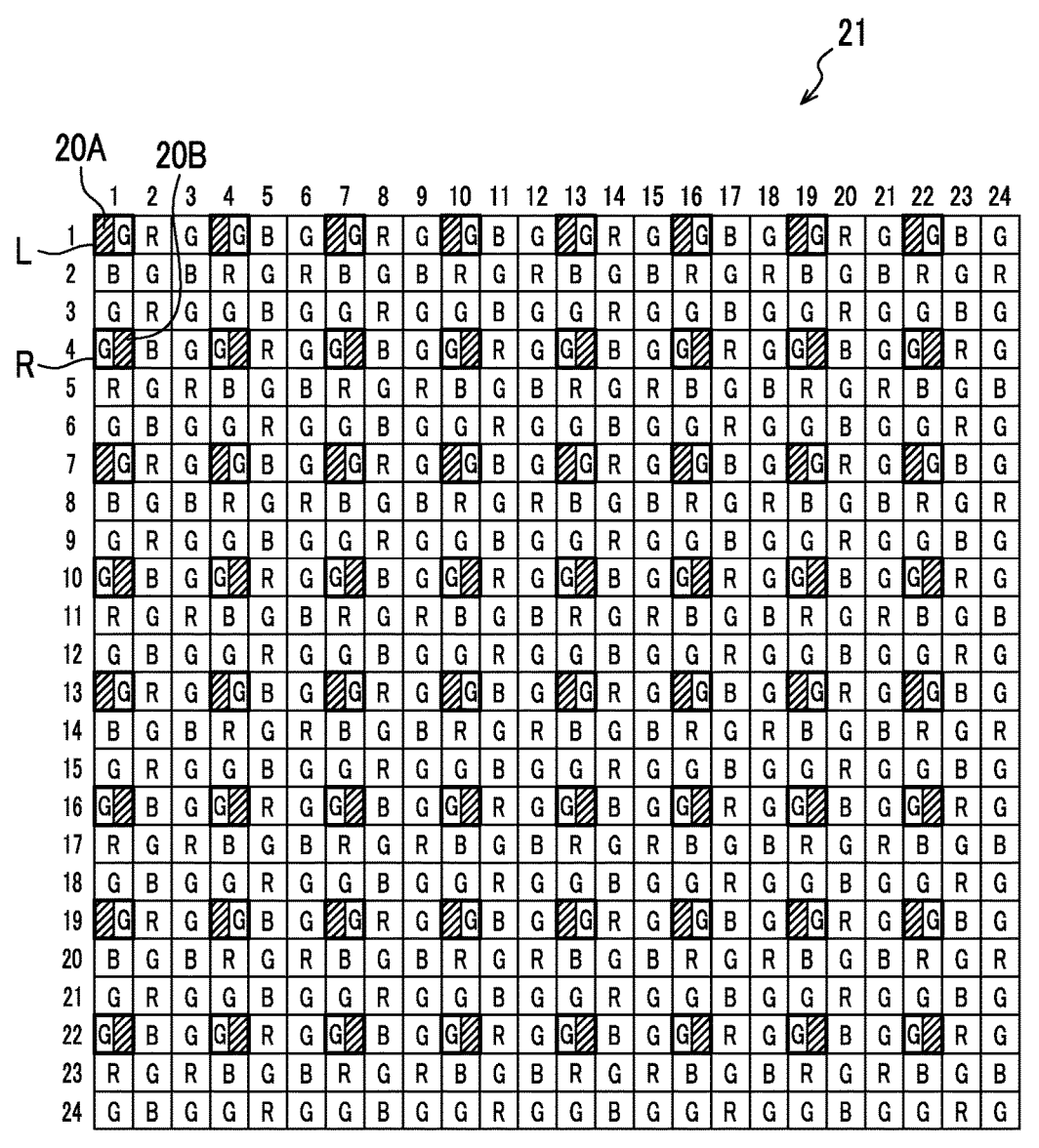

For example, a color filter 21 illustrated in FIG. 4 is provided in the imaging element 20. For example, as illustrated in FIG. 4, the color filter 21 includes a first filter G corresponding to green (G) which most contributes to obtaining a brightness signal, a second filter R corresponding to red (R), and a third filter B corresponding to blue (B).

In addition, the imaging device 100 according to this embodiment has a phase difference AF function. The imaging element 20 according to this embodiment includes a plurality of phase difference detecting pixels which are used when the phase difference AF function is performed. The plurality of phase difference detecting pixels are arranged in a predetermined pattern.

The phase difference detecting pixel is a first pixel L having a shielded left half in the horizontal direction or a second pixel R having a shielded right half in the horizontal direction. Hereinafter, when the first pixel L and the second pixel R do not need to be distinguished from each other, they are referred to as "phase difference pixels".

Figure 5:
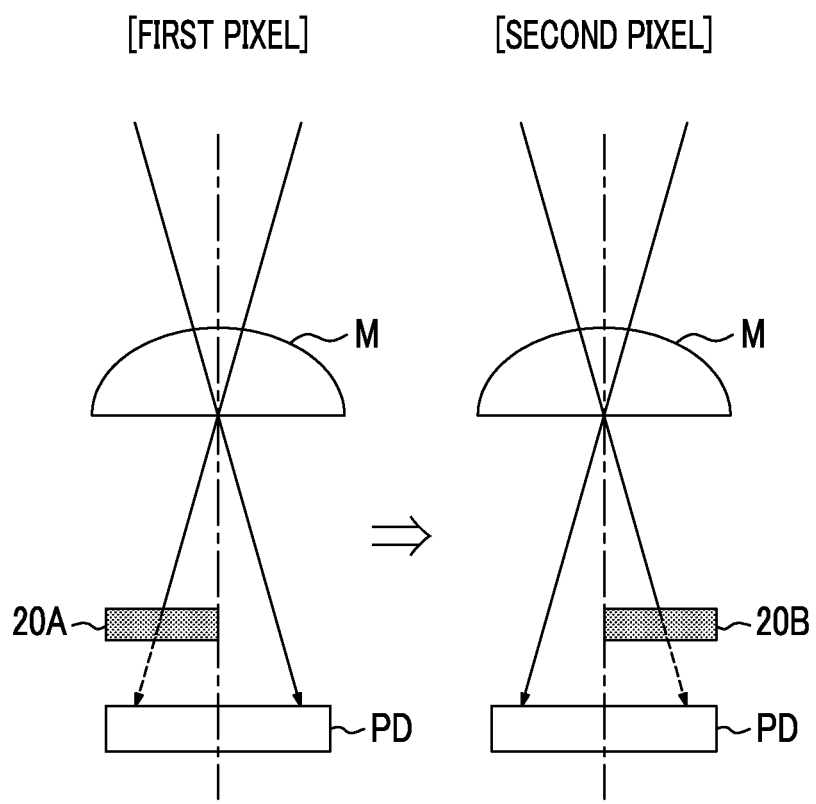
FIG. 5 is a schematic diagram illustrating an example of the structure of phase difference pixels (a first pixel and a second pixel) in the imaging element of the imaging device according to the embodiment.

For example, as illustrated in FIG. 5, the first pixel L has a light shielding member 20A and the second pixel R has a light shielding member 20B. The light shielding member 20A is provided on the front surface side (on the side of a microlens M) of a photodiode PD and shields the left half of the light receiving surface. The light shielding member 20B is provided on the front surface side of the photodiode PD and shields the right half of the light receiving surface.

The microlens M and the light shielding members 20A and 20B function as a pupil division portion. The first pixel L receives only light beams on the left side of the optical axis among the light beams which pass through the exit pupil of the imaging lens 16. The second pixel R receives only light beams on the right side of the optical axis among the light beams which pass through the exit pupil of the imaging lens 16. As such, the light beams which pass through the exit pupil are divided into left and right light beams by the microlens M and the light shielding members 20A and 20B serving as the pupil division portion and the left and right light beams are incident on the first pixel L and the second pixel R, respectively.

Further, in an object image corresponding to the left light beams and an object image corresponding to the right light beams among the light beams which pass through the exit pupil of the imaging lens 16, portions which are in focus (in a focused state) are formed at the same position on the imaging element 20. In contrast, a front-focused portion which is focused in front of the object or a back-focused portion which is focused on the rear side of the object are incident on different positions on the imaging element 20 (a phase shift occurs). Therefore, the object image corresponding to the left light beams and the object image corresponding to the right light beams can be acquired as parallax images (a left eye image and a right eye image) with different parallaxes.

The imaging device 100 according to this embodiment detects the amount of phase shift on the basis of the value of the first pixel L and the value of the second pixel R. Then, the imaging device 100 presents the detected amount of phase shift to assist the user in adjusting the focal position of the imaging lens 16. Hereinafter, when the light shielding members 20A and 20B do not need to be distinguished from each other, they are referred to as "light shielding members" without a reference numeral.

The imaging element 20 according to this embodiment is divided into a first pixel group, a second pixel group, and a third pixel group. The first pixel group indicates, for example, a plurality of first pixels L. The second pixel group indicates, for example, a plurality of second pixels R. The third pixel group indicates, for example, a plurality of normal pixels. The "normal pixels" indicate, for example, pixels (for example, pixels without the light shielding members 20A and 20B) other than the phase difference pixels. Hereinafter, a RAW image indicated by image signals output from the first pixel group is referred to as a "first image". A RAW image indicated by image signals output from the second pixel group is referred to as a "second image". A RAW image indicated by image signals output from the third pixel group is referred to as a "third image".

Each pixel included in the first pixel group and the second pixel group is arranged so as to be located in the range of one pixel in the horizontal direction in the first pixel group and the second pixel group. In addition, each pixel included in the first pixel group and the second pixel group is arranged so as to be located in the range of one pixel in the vertical direction in the first pixel group and the second pixel group. In the example illustrated in FIG. 4, the first pixels L and the second pixels R are alternately arranged in the horizontal direction and the vertical direction at intervals corresponding to a plurality of pixels (in this embodiment, two pixels).

In the example illustrated in FIG. 4, each pixel included in the first and second pixel groups is arranged in the range of one pixel in each of the horizontal direction and the vertical direction. However, each pixel may be positioned in the range of a predetermined number of pixels (for example, two pixels) in at least one of the horizontal direction and the vertical direction. For example, as illustrated in FIG. 4, it is preferable that each pixel included in the first and second pixel groups is located in the range of one pixel in each of the horizontal direction and the vertical direction, in order to minimize the occurrence of image deviation caused by factors other than defocus.

For example, as illustrated in FIG. 4, the phase difference pixel is provided for a G filter in a square array corresponding to 2×2 pixels (for example, a pixel in the third row and the third column, a pixel in the third row and the fourth column, a pixel in the fourth row and the third column, and a pixel in the fourth row and the fourth column from the upper left side in the front view of FIG. 4). In this embodiment, a pixel at the lower right corner among the G filters corresponding to 2×2 pixels in the front view of FIG. 4 is allocated as the phase difference pixel.

As such, in the color filter 21, the light shielding member is provided in the pixel at the lower right corner among the G filters corresponding to 2×2 pixels. The phase difference pixels are arranged in the vertical direction and the horizontal direction at regular intervals corresponding to a plurality of pixels. Therefore, since a relatively large number of normal pixels are arranged around the phase difference pixel, it is possible to improve the accuracy of interpolation when the value of the phase difference pixel is interpolated from the values of the normal pixels. In addition, since the pixels included in the first to third pixel groups are arranged such that the normal pixels used for interpolation do not overlap each other between the phase difference pixels, the accuracy of interpolation is expected to be further improved.

Returning to FIG. 3, the imaging element 20 outputs an image signal (a digital signal indicating the value of each first pixel) indicating the first image from the first pixel group and outputs an image signal (a digital signal indicating the value of each second pixel) indicating the second image from the second pixel group. In addition, the imaging element 20 outputs an image signal (a digital signal indicating the value of each normal pixel) indicating the third image from the third pixel group. The third image is a chromatic color image and is, for example, a color image having the same color array as the array of the normal pixels. Image data indicating the first image, the second image, and the third image is temporarily stored in the volatile storage area of the memory 26 via the interface unit 24.

The image processing unit 28 includes a normal processing unit 30. The normal processing unit 30 processes R, G, and B signals corresponding to the third pixel group to generate a chromatic normal image which is an example of a first display image. In addition, the image processing unit 28 includes a split image processing unit 32. The split image processing unit 32 processes G signals corresponding to the first pixel group and the second pixel group to generate an achromatic split image which is an example of a second display image. The image processing unit 28 according to this embodiment is implemented by, for example, an application specific integrated circuit (ASIC) which is an integrated circuit obtained by integrating circuits for implementing a plurality of functions related to image processing. The CPU 12 executes an imaging control processing program, which will be described below, to perform control such that the split image processing unit 32 generates a split image and the display unit 213 displays the generated split image. However, the hardware configuration of the image processing unit 28 is not limited to the ASIC. For example, the image processing unit 28 may have other hardware configurations such as a programmable logic device or a computer including a CPU, a ROM, and a RAM.

The encoder 34 converts an input signal into a signal of another format and outputs the converted signal. The hybrid finder 220 includes an LCD 247 which displays an electronic image. The number of pixels in a predetermined direction (for example, the number of pixels in the horizontal direction in which parallax occurs) in the LCD 247 is less than the number of pixels in the same direction in the display unit 213. The display control unit 36 is connected to the display unit 213 and the LCD 247 and selectively controls the LCD 247 and the display unit 213 such that the LCD 247 or the display unit 213 displays images. Hereinafter, when the display unit 213 and the LCD 247 do not need to be distinguished from each other, they are referred to as "display devices".

The imaging device 100 according to this embodiment is configured such that the operation mode is switched between a manual focus mode and an automatic focus mode by the dial 212. When one of the focus modes is selected, the display control unit 36 directs the display device to display the live view image with which the split image is combined. In addition, when the automatic focus mode is selected by the dial 212, the CPU 12 operates as a phase difference detection unit and an automatic focus adjustment unit. The phase difference detection unit detects a phase difference between the first image output from the first pixel group and the second image output from the second pixel group. The automatic focus adjustment unit controls a lens driving unit (not illustrated) through the mounts 256 and 346 on the basis of the detected phase difference such that the imaging lens 16 is moved to the focal position and the amount of defocus of the imaging lens 16 is zero, in response to an instruction from the device control unit 22. The "amount of defocus" means, for example, the amount of phase shift between the first image and the second image.

The eye approach detection unit 37 detects whether the user looks through the finder eyepiece 242 and outputs the detection result to the CPU 12. Therefore, the CPU 12 can check whether the finder eyepiece 242 is used on the basis of the detection result of the eye approach detection unit 37.

The external I/F 39 is connected to a network, such as a local area network (LAN) or the Internet, and transmits and receives various kinds of information between an external apparatus (for example, a printer) and the CPU 12 through the network. Therefore, when a printer is selected as the external apparatus, the imaging device 100 can output the captured still image to the printer such that the still image is printed by the printer. When a display is connected as the external apparatus, the imaging device 100 can output the captured still image or live view image to the display such that the image is displayed on the display.

As illustrated in FIG. 6, the normal processing unit 30 and the split image processing unit 32 each include a WB gain unit, a gamma correction unit, and a synchronization processing unit (not illustrated) and sequentially perform signal processing on the original digital signal (RAW image) which is temporarily stored in the memory 26. That is, the WB gain unit adjusts the gain of the R, G, and B signals to perform white balance (WB) correction. The gamma correction unit performs gamma correction on the R, G, and B signals whose white balance has been corrected by the WB gain unit. The synchronization processing unit performs a color interpolation process corresponding to the array of the color filters 21 in the imaging element 20 to generate R, G, and B signals which are synchronized with each other. Whenever the imaging element 20 acquires a RAW image corresponding to one screen, the normal processing unit 30 and the split image processing unit 32 perform image processing on the RAW image in parallel.

When R, G, and B RAW images are input from the interface unit 24, the normal processing unit 30 interpolates the pixels which are shielded by the phase difference image among the R, G, and B pixels of the third pixel group using neighboring pixels (for example, adjacent G pixels) of the same color in the first pixel group and the second pixel group. The normal processing unit 30 may use the image obtained by the interpolation as a normal image for display and a normal image for recording.

In addition, the normal processing unit 30 outputs the image data of the generated normal image for recording to the encoder 34. The R, G, and B signals processed by the normal processing unit 30 are converted (encoded) into signals for recording by the encoder 34 and are recorded in a recording unit 42 (see FIG. 6). The normal processing unit 30 outputs the image data of the generated normal image for display to the display control unit 36. Hereinafter, for convenience of explanation, when the "normal image for recording" and the "normal image for display" do not need to be distinguished from each other, they are referred to as "normal images" without the words "for recording" and "for display".

The imaging element 20 can change the exposure conditions (for example, an electronic shutter speed) of the first pixel group and the second pixel group to acquire images with different exposure conditions at the same time. Therefore, the image processing unit 28 can generate an image in a wide dynamic range on the basis of the images with different exposure conditions. In addition, it is possible to simultaneously acquire a plurality of images under the same exposure conditions and the images can be added to generate a high-sensitivity image with little noise or a high-resolution image.

The split image processing unit 32 extracts the G signals of the first pixel group and the second pixel group from the RAW image which is temporarily stored in the memory 26 and generates an achromatic split image on the basis of the G signals of the first pixel group and the second pixel group. As described above, each of the first pixel group and the second pixel group extracted from the RAW image is a pixel group including the pixels provided with the G filters. Therefore, the split image processing unit 32 can generate an achromatic left parallax image and an achromatic right parallax image on the basis of the G signals of the first pixel group and the second pixel group. Hereinafter, for convenience of explanation, the "achromatic left parallax image" is referred to as a "left eye image" and the "achromatic right parallax image" is referred to as a "right eye image".

The split image processing unit 32 combines the left eye image which is based on the first image output from the first pixel group and the right eye image which is based on the second image output from the second pixel group to generate a split image. The image data of the generated split image is output to the display control unit 36.

The display control unit 36 generates display image data on the basis of recording image data corresponding to the third pixel group which is input from the normal processing unit 30 and the image data of the split image corresponding to the first and second pixel groups which is input from the split image processing unit 32. For example, the display control unit 36 combines the split image indicated by the image data which is input from the split image processing unit 32 with a display region of the normal image indicated by the recording image data corresponding to the third pixel group which is input from the normal processing unit 30. Then, the display control unit 36 outputs the combined image data to the display device.

The split image generated by the split image processing unit 32 is a plurality of divided images which are obtained by combining a portion of the left eye image and a portion of the right eye image. An example of the "plurality of divided images" is a split image 300 illustrated in FIGS. 7A and 7B. The split image 300 is a combination of an upper half divided image of two divided images which are obtained by dividing a left eye image 300A in the up-down direction in the front views of FIGS. 7A and 7B and a lower half divided image of two divided images which are obtained by dividing a right eye image 300B in the up-down direction. In the split image 300, each divided image of the left eye image 300A and the right eye image 300B is shifted in a predetermined direction (in this embodiment, in the left-right direction of the front views of FIGS. 7A and 7B) by a value corresponding to the focusing state.

In this embodiment, when the split image 300 is combined with a normal image 301, the split image 300 is inserted instead of a portion of the normal image. However, a combination method is not limited thereto. For example, a combination method which superimposes the split image 300 on the normal image 301 may be used. In addition, when the split image 300 is superimposed, a combination method may be used which appropriately adjusts the transmissivities of the split image 300 and a portion of the normal image 301 corresponding to a region on which the split image 300 is superimposed. Alternatively, the normal image 301 and the split image 300 may be displayed on different layers. In this case, it is possible to display the split image 300 in a display region of the normal image in the live view image. The live view image is an image indicating an object image when a continuously captured object image is continuously displayed on the screen of the display device.

As illustrated in FIG. 6, the hybrid finder 220 includes the OVF 240 and the EVF 248. The OVF 240 is an inverted Galilean finder including an objective lens 244 and an eyepiece lens 246. The EVF 248 includes the LCD 247, a prism 245, and the eyepiece lens 246.

A liquid crystal shutter 243 is provided in front of the objective lens 244. The liquid crystal shutter 243 shields light such that an optical image is not incident on the objective lens 244 when the EVF 248 is used.

The prism 245 reflects an electronic image or various kinds of information displayed on the LCD 247 to the eyepiece lens 246 and combines the optical image and information (an electronic image and various kinds of information) displayed on the LCD 247.

Whenever the finder switching lever 214 is rotated in the direction of the arrow SW illustrated in FIG. 1, the operation mode is alternately switched between an OVF mode in which an optical image can be viewed through the OVF 240 and an EVF mode in which an electronic image can be viewed through the EVF 248.

In the OVF mode, the display control unit 36 performs control such that the liquid crystal shutter 243 does not shield light and an optical image can be viewed from the finder eyepiece 242. In addition, only the split image 300 is displayed on the LCD 247. Therefore, it is possible to display a finder image in which the split image 300 is superimposed on a portion of the optical image.

In contrast, in the EVF mode, the display control unit 36 performs control such that the liquid crystal shutter 243 shields light and only the electronic image displayed on the LCD 247 can be viewed from the finder eyepiece 242. In addition, the same image data as that, with which the split image 300 output to the display unit 213 is combined, is input to the LCD 247. Therefore, the display control unit 36 can display an electronic image in which the split image 300 is combined with a portion of the normal image 301, similarly to the display unit 213.

Figure 7B:
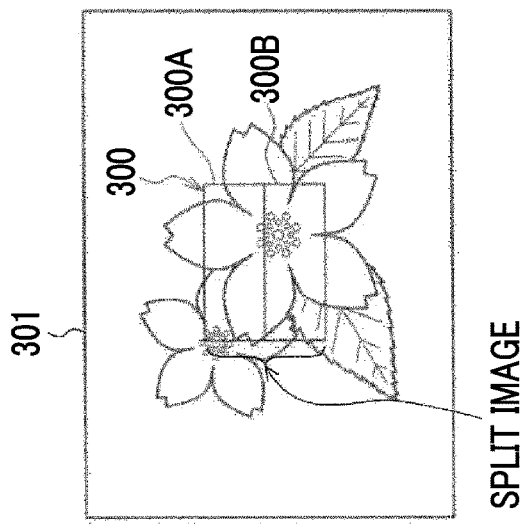
FIG. 7B is a front view illustrating an example of the display aspect of the normal image and the split image according to the embodiment.

It is assumed that image signals indicating the normal image 301 and the split image 300 are input to the display device. In this case, for example, as illustrated in FIGS. 7A and 7B, the display device displays the split image 300 indicated by the input image signal in a rectangular display region of the split image 300 which is arranged at the center of the screen. In addition, the display device displays the normal image 301 indicated by the input image signal in an outer circumferential region of the split image 300. When the image signal indicating the split image 300 is not input and only the image signal indicating the normal image 301 is input, the display device displays the normal image 301 indicated by the input image signal in the entire display region of the display device. When the image signal indicating the normal image 301 is not input and only the image signal indicating the split image 300 is input, the display device displays the split image 300 indicated by the input image signal in the display region and leaves the outer circumferential region blank.

Figure 8:
FIG. 8 is a diagram illustrating an example of the structure of conversion information according to the first embodiment.

However, in the imaging device 100 according to this embodiment, conversion information which is used to correct distortion caused by the imaging lens 16 is stored in the memory 26 in advance. As illustrated in FIG. 8, conversion information 320 according to this embodiment includes focal length information 320a indicating the range of a plurality of predetermined focal lengths. In the conversion information 320, normal image conversion information 320b indicating a conversion parameter for correcting the distortion of a corresponding normal image 301 is associated with each focal length information item 320a. In addition, in the conversion information 320, split image conversion information 320c indicating a conversion parameter for correcting the distortion of the split image 300 is associated with each focal length information item 320a.

The conversion parameter according to this embodiment is a parameter in which the values of a plurality of predetermined coordinates before conversion are associated with the values of the coordinates after conversion in the image to be corrected. The imaging device 100 corrects the distortion of each of the normal image 301 and the split image 300 on the basis of the conversion information 320. That is, the imaging device 100 according to this embodiment corrects the distortion of each of the normal image 301 and the split image 300 on the basis of the focal length of the imaging lens 16.

The division interval of the focal length in the conversion information 320 increases as the focal length increases. This is because distortion is reduced as the focal length increases, that is, a magnification ratio is reduced.

As described above, the imaging device 100 according to this embodiment corrects the distortion of each of the normal image 301 and the split image 300 on the basis of the focal length of the imaging lens 16. However, the invention is not limited thereto. For example, the imaging device 100 may correct the distortion of each of the normal image 301 and the split image 300 on the basis of the aperture value of the imaging lens 16, considering the fact that distortion is reduced as the aperture value of the imaging lens 16 is reduced. In this case, in the conversion information, the normal image conversion information 320b and the split image conversion information 320c are associated with each aperture value information item indicating a plurality of predetermined aperture values.

A conversion parameter of the split image 300 is a conversion parameter which converts the coordinates of each pixel in the split image 300 only in an orthogonal direction which will be described below.

The imaging device 100 according to this embodiment performs an imaging control process which combines the left eye image 300A and the right eye image 300B to generate the split image 300, displays the split image 300 on the LCD 247, and performs imaging control after the user adjusts the focal point using the split image 300.

Next, the operation of the imaging device 100 according to this embodiment will be described with reference to FIG. 9. FIG. 9 is a flowchart illustrating the flow of the process of an imaging control processing program executed by the CPU 12 when the imaging device 100 is set to the manual focus mode and the release switch 211 is in the halfway pressed state. In this embodiment, the program is stored in a predetermined storage area of the memory 26 in advance.

First, in Step S401, the imaging device 100 acquires image data indicating the left eye image 300A based on the image signal which is output from the first pixel group and image data indicating the right eye image 300B based on the image signal which is output from the second pixel group through the interface unit 24. The CPU 12 stores each of the acquired image data items in a predetermined storage area of the memory 26.

Then, in Step S403, the imaging device 100 acquires image data indicating the normal image 301 based on the image signal which is output from the third pixel group through the interface unit 24. As such, the imaging device 100 according to this embodiment acquires the image data indicating the normal image 301 from the third pixel group. However, the invention is not limited thereto. The imaging device 100 may generate the image data indicating the normal image 301 on the basis of the image data acquired in Steps S401 and S403.

For example, a method which uses the image data indicating the left eye image 300A or the right eye image 300B as the image data indicating the normal image 301, without any change, may be given as an example of a method for generating the image data indicating the normal image 301. In addition, the following method may be used: an interpolation pixel is provided between adjacent pixels in the image data indicating the left eye image 300A or the right eye image 300B; and the image data indicating the normal image 301 is generated using the average value of the values of the pixels around the interpolation pixel as the value of the interpolation pixel. As a method for generating the normal image 301, a method may be used which combines the image data indicating the left eye image 300A and the image data indicating the right eye image 300B to generate the image data indicating the normal image 301.

Then, in Step S407, the focal length of the imaging lens 16 which is set at this point in time is acquired and the conversion parameter of the normal image 301 corresponding to the acquired focal length is acquired. In this embodiment, the CPU 12 reads, from the memory 26, the normal image conversion information 230b associated with the focal length information 320a of the acquired focal length in the conversion information 320 and acquires the conversion parameter (hereinafter, referred to as a "normal image conversion parameter") of the normal image 301.

Then, in Step S409, the distortion of the normal image 301 is corrected on the basis of the normal image conversion parameter. In this embodiment, the CPU 12 converts the coordinates which are included in the coordinate values of the acquired normal image conversion parameters before conversion among the coordinates of each pixel in the normal image 301 into coordinate values after conversion which are associated with the coordinate values before conversion. The CPU 12 performs linear interpolation or non-linear interpolation on the coordinates which are not included in the coordinate values of the normal image conversion parameters before conversion, using an arithmetic expression, on the basis of the coordinate values of a plurality of coordinates close to the coordinates among the coordinate values of the normal image conversion parameters before conversion, to calculate coordinates after conversion. In this way, the CPU 12 obtains the converted values of the coordinates to be converted. In this embodiment, linear interpolation is performed to obtain the converted values of the coordinates to be converted. In addition, the conversion information 320 may be stored as a table in which the values of all of the coordinates before conversion are associated with the converted values of all of the coordinates in the normal image 301 and the converted values of the coordinates to be converted may be obtained only by the table. Alternatively, the conversion information 320 stores an arithmetic expression for the conversion and the converted values of the coordinates to be converted may be obtained only by the arithmetic expression.

Figure 10A:
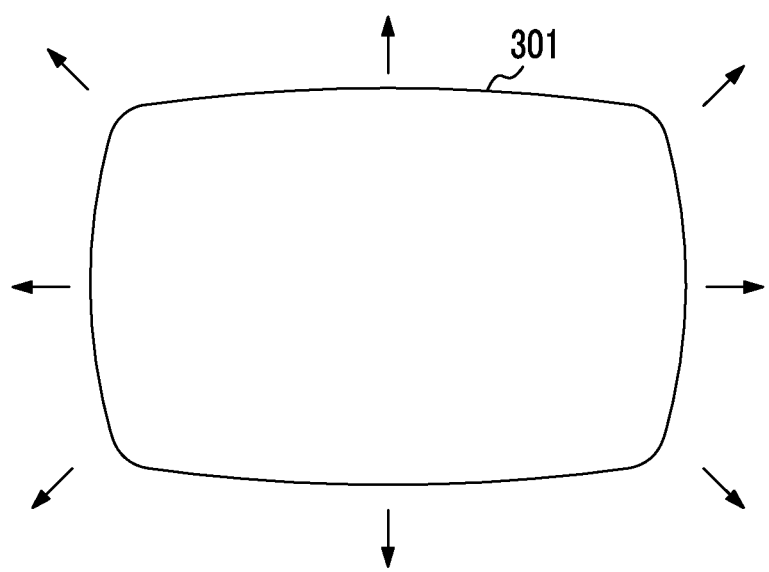
FIG. 10A is a front view illustrating an example of the normal image according to the first embodiment before distortion is corrected.
Figure 10B:
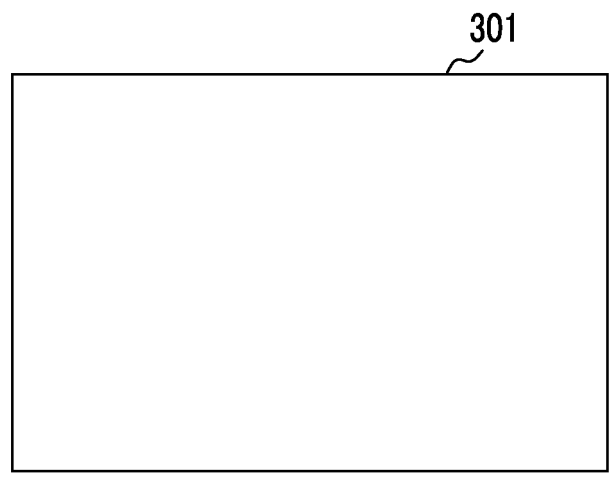
FIG. 10B is a front view illustrating an example of the normal image according to the first embodiment after distortion is corrected.

For example, as illustrated in FIG. 10A, the normal image 301 acquired by the process in Step S403 has a distorted shape due to the distortion. However, for example, as illustrated in FIG. 10B, the distortion of the normal image 301 is corrected in Step S409 and the normal image 301 has a rectangular shape.

Then, in Step S411, the CPU 12 performs control such that the normal image 301 whose distortion has been corrected is displayed on the display unit 213. In this embodiment, the CPU 12 performs control such that the normal image 301 is displayed on the display unit 213. However, the invention is not limited thereto. For example, the CPU 12 may perform control such that the normal image is displayed on the LCD 247. In addition, when the eye approach detection unit 37 detects that the user looks through the finder eyepiece 242, the CPU 12 may display the normal image 301 on the LCD 247. In the other cases, the CPU 12 may display the normal image 301 on the display unit 213.

Then, in Step S413, the CPU 12 acquires the focal length which is set at this point in time and acquires the conversion parameter of the split image 300 corresponding to the acquired focal length. In this embodiment, the CPU 12 reads, from the memory 26, the split image conversion information 230c corresponding to the acquired focal length in the conversion information 320. In this way, the CPU 12 acquires the conversion parameter (hereinafter, referred to as a "split image conversion parameter") of the split image 300.

Then, in Step S415, the CPU 12 performs control such that the split image processing unit 32 generates a split image. First, the split image processing unit 32 reads, from the memory 26, information (hereinafter, referred to as "display region information") indicating a display region of the split image 300 in the display unit 213. In this embodiment, as the display region information, information indicating the range of a display region (in this embodiment, a central portion of the normal image 301) indicated by a predetermined coordinate system in the display region of each display device is stored in the memory 26 in advance. In addition, the split image processing unit 32 determines the division direction of each of the left eye image 300A and the right eye image 300B. In this embodiment, information (hereinafter, referred to as "division direction information") indicating the division direction is stored in the memory 26 in advance and the CPU 12 reads the division direction information and determines the division direction.

In addition, the split image processing unit 32 reads, from the memory 26, information (hereinafter, referred to as "division number information") indicating the number of divisions for each of the left eye image 300A and the right eye image 300B. In this embodiment, the division number information is stored in the memory 26 in advance. The split image processing unit 32 generates the split image 300 on the basis of information indicating each of the display region, the division direction, and the number of divisions obtained by the above-mentioned process.

Then, in Step S417, the distortion of the split image 300 is corrected on the basis of the acquired split image conversion parameter. In this embodiment, when performing the correction, the CPU 12 converts the coordinates of each pixel in the split image 300 on the basis of the split image conversion parameter, using the same method as that used for the normal image 300 (Step S409). At that time, the CPU 12 corrects the distortion of the split image 300 in the division direction and does not correct the distortion of the split image 300 in a direction (hereinafter, referred to as an "orthogonal direction") orthogonal to the division direction.

Then, in Step S419, the CPU 12 performs control such that the split image 300 whose distortion has been corrected is displayed on the display region of the display unit 213. In this embodiment, the CPU 12 displays the split image 300 so as to be superimposed on a central portion of the normal image 301.

Figure 11:
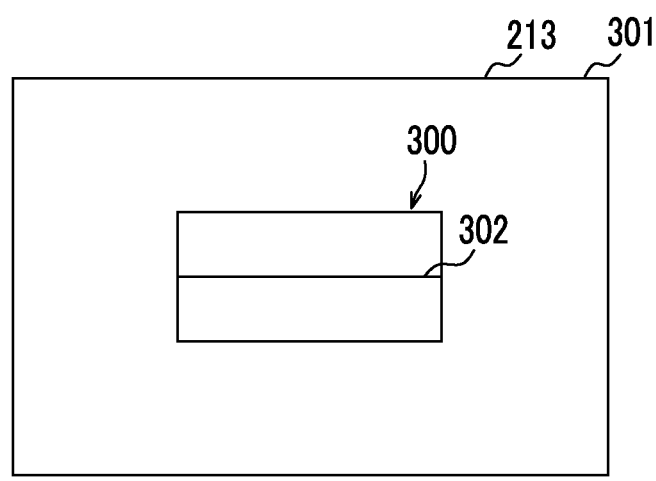
FIG. 11 is a front view illustrating an example of the display of the normal image and the split image according to the first embodiment after distortion is corrected.

For example, as illustrated in FIG. 11, the normal image 301 is displayed in the entire display region of the display unit 213 and the split image 300 having a straight interface 302 is displayed in the central portion of the display region.

Distortion is reduced toward the center of the imaging lens 16. Therefore, when only the distortion of the split image 300 in the orthogonal direction is corrected, a line along the orthogonal direction in the central portion of the display region in the division direction is a straight line after the distortion is corrected.

Figure 12A:
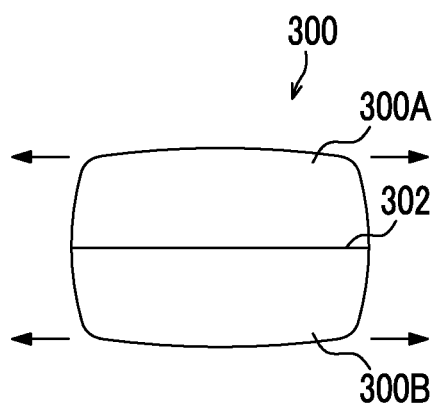
FIG. 12A is a front view illustrating an example of the split image according to the first embodiment before distortion is corrected.
Figure 12B:
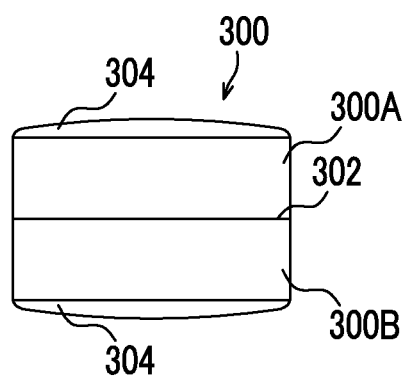
FIG. 12B is a front view illustrating an example of the split image according to the first embodiment after distortion is corrected.

For example, as illustrated in FIG. 12A, the split image 300 generated in Step S415 has a distorted shape due to the distortion. However, for example, as illustrated in FIG. 12B, the split image 300 which has been corrected in Step S417 extends in a straight line along the orthogonal direction (the left-right direction in the front view of FIG. 12B) in the central portion in the division direction (the up-down direction in the front view of FIG. 12B). Therefore, the interface 302 between the left eye image 300A and the right eye image 300B is a straight line shape. In this way, the user can visually check the amount of deviation between the left eye image 300A and the right eye image 300B in the split image 300 with ease.

Figure 12C:
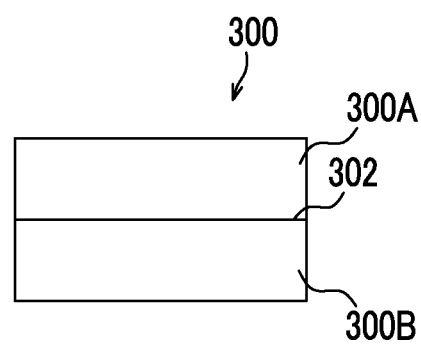
FIG. 12C is a front view illustrating an example of the split image according to the first embodiment after distortion is corrected.

For example, as illustrated in FIG. 12C, the CPU 12 removes a convex portion 304 protruding from a rectangular frame which is included in the split image 300 and has the maximum area such that the split image 300 has a rectangular shape.

Figure 12D:
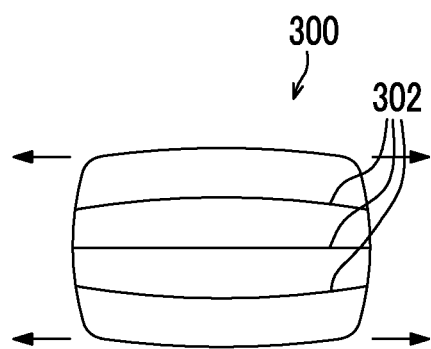
FIG. 12D is a front view illustrating an example of the split image according to the first embodiment before distortion is corrected.
Figure 12E:
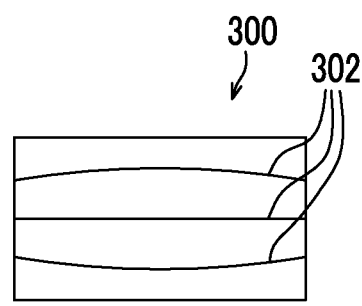
FIG. 12E is a front view illustrating an example of the split image according to the first embodiment after distortion is corrected.

For example, as illustrated in FIG. 12D, when the split image 300 is divided into three or more regions, the interfaces 302 of the split image 300 generated in Step S415 have different curved or straight line shapes. However, the split image 300 which has been corrected in Step S417 extends in a straight line along the orthogonal direction in the vicinity of the central portion in the division direction. Therefore, for example, as illustrated in FIG. 12E, the interfaces 302 have linear shapes which are substantially parallel to each other. In addition, a convex portion protruding from a rectangular frame which is included in the split image 300 illustrated in FIG. 12E and has the maximum area is removed such that the split image 300 has a rectangular shape.

Then, in Step S421, the CPU 12 determines whether the cross key 222 is operated to input a zoom instruction and determines whether a zoom operation is performed. When the determination result in Step S421 is "Yes", the CPU 12 proceeds to Step S423. When the determination result in Step S421 is "No", the CPU 12 proceeds to Step S425. In Step S423, the CPU 12 changes a zoom ratio according to the operation and moves the focal position.

In Step S425, the CPU 12 determines whether an imaging instruction is input. At that time, when an operation of fully pressing the release switch 211 is detected, the CPU 12 determines that the imaging instruction has been input. When the determination result in Step S425 is "No", the CPU 12 returns to Step S401. On the other hand, when the determination result in Step S425 is "Yes", the CPU 12 proceeds to Step S427.

In Step S427, the CPU 12 performs an imaging process of recording the image data indicating the normal image 301 in the memory 26 and ends the imaging control processing program. Since the imaging process is a general process, the description thereof will not be repeated in this embodiment.

Second Embodiment

Hereinafter, an imaging device 100 according to a second embodiment will be described in detail with reference to the accompanying drawings.

In the first embodiment, the conversion parameter is acquired according to the focal length of the imaging lens 16. However, in the second embodiment, a conversion parameter is acquired according to the type of interchangeable lens 258. Examples of the type of interchangeable lens 258 according to the invention include prime lenses with different focal lengths and a telecentric lens.

Since the imaging device 100 according to the second embodiment has the same structure as the imaging device 100 according to the first embodiment, the description thereof will not be repeated in this embodiment.

Figure 13:
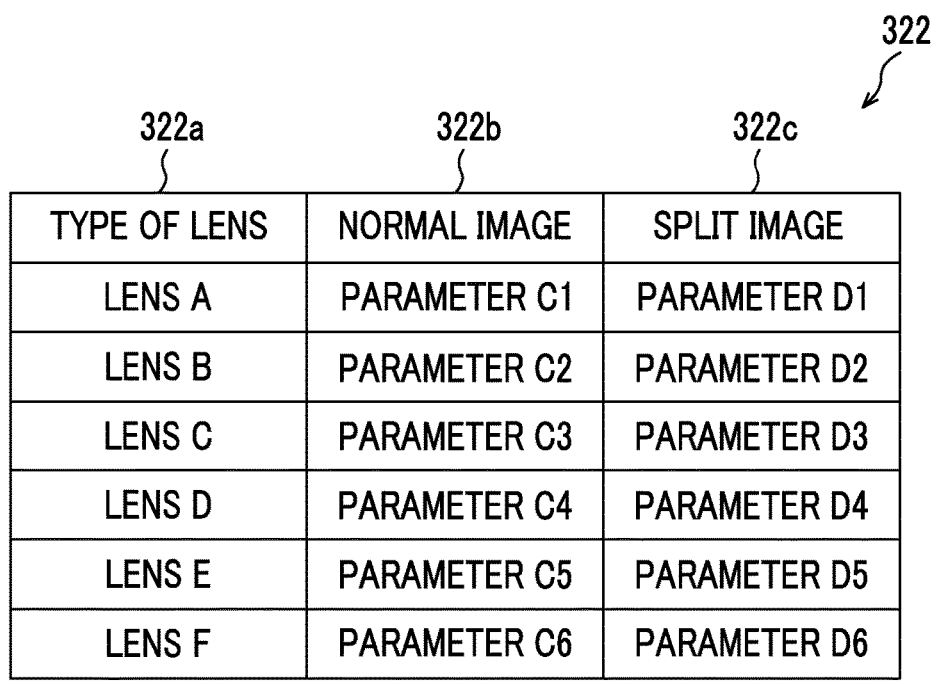
FIG. 13 is a diagram illustrating an example of the structure of conversion information according to the second embodiment.

In the imaging device 100 according to this embodiment, conversion information which is used to correct the distortion of an imaging lens 16 is stored in a memory 26 in advance. As illustrated in FIG. 13, conversion information 322 according to this embodiment includes lens information 322a indicating the types of a plurality of predetermined lenses. In addition, in the conversion information 322, normal image conversion information 322b indicating a conversion parameter for correcting the distortion of a corresponding normal image 301 is associated with each lens information item 322a. In the conversion information 322, split image conversion information 322c indicating a conversion parameter for correcting the distortion of a split image 300 is associated with each lens information item 322a.

In the conversion parameter according to the second embodiment, similarly to the first embodiment, for a plurality of predetermined coordinates in the image to be corrected, coordinate values before conversion are associated with coordinate values after conversion. In addition, the conversion parameter of the split image 300 is used to convert the coordinates of each pixel in the split image 300 only in the orthogonal direction. The imaging device 100 corrects the distortion of each of the normal image 301 and the split image 300 using the conversion information 322.

Figure 14:
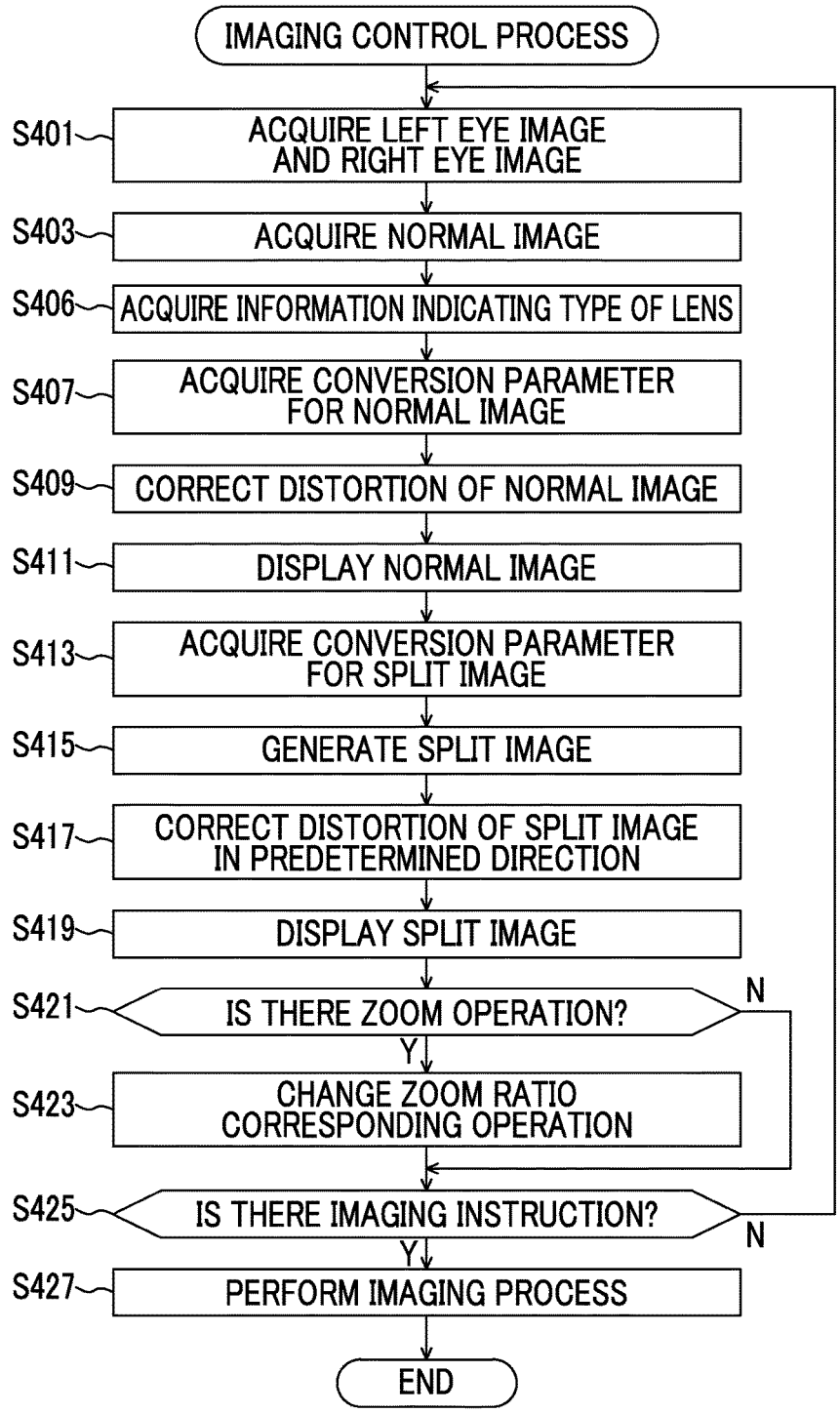
FIG. 14 is a flowchart illustrating the flow of the process of an imaging control processing program according to the second embodiment.

Next, the operation of the imaging device 100 when an imaging control process according to this embodiment is performed will be described with reference to FIG. 14. FIG. 14 is a flowchart illustrating the flow of the process of an imaging control processing program executed by a CPU 12 of the imaging device 100 at that time. The program is stored in a predetermined area of a ROM of the memory 26.

The same steps as those in the imaging control process according to the first embodiment are denoted by the same step numbers and the description thereof will not be repeated.

In the second embodiment, after Step S403 is performed, the CPU 12 proceeds to Step S406 and acquires information indicating the type of lens. Then, the CPU 12 proceeds to Step S407. In the imaging device 100 according to this embodiment, when an interchangeable lens 258 is mounted on a camera body 200, the CPU 12 acquires an electric signal indicating the type of lens from the interchangeable lens 258.

In Step S407, the CPU 12 acquires a normal image conversion parameter corresponding to the type of lens indicated by the acquired information indicating the type of lens. In this embodiment, the CPU 12 reads, from the memory 26, normal image conversion information 232b which is associated with the lens information 322a indicating the type of lens in the conversion information 322 and acquires the normal image conversion parameter.

In Step S413, the CPU 12 acquires a split image conversion parameter corresponding to the type of lens indicated by the acquired information indicating the type of lens. In this embodiment, the CPU 12 reads, from the memory 26, split image conversion information 232c which is associated with the lens information 322a indicating the type of lens in the conversion information 322 and acquires the split image conversion parameter.

The imaging device 100 according to this embodiment may be provided with a mounting portion (not illustrated) to which a conversion lens can be mounted and the conversion lens may be mounted on the imaging device 100 through the mounting portion. In this case, the conversion lens is, for example, a wide conversion lens which captures an image on the wide-angle side of the focal length of the imaging lens 16 and a tele conversion lens which captures an image on the telephoto side of the focal length of the imaging lens 16. The conversion lens is mounted on a portion of the body of the imaging device 100 to which the imaging lens 16 is not mounted, is mounted on the body of the imaging device 100, or is mounted between the imaging lens 16 and the body of the imaging device 100. In this way, the conversion lens is mounted on the imaging device 100. The conversion parameter may be acquired according to whether the conversion lens is present or absent or the type of conversion lens when the conversion lens is mounted.

Figure 15:
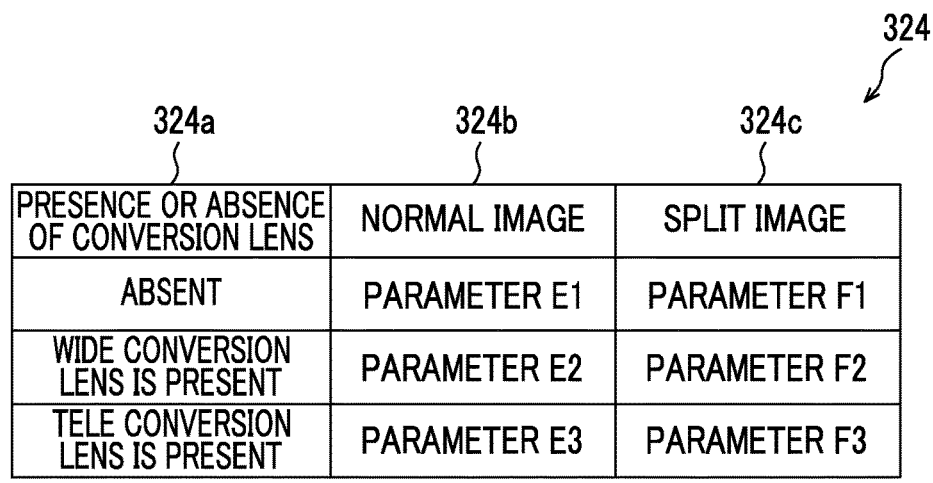
FIG. 15 is a diagram illustrating another example of the structure of the conversion information according to the second embodiment.

In this embodiment, the conversion parameter is acquired according to the type of interchangeable lens 258. However, the invention is not limited thereto. For example, the conversion parameter may be acquired according to the type of conversion lens. In this case, conversion information which is used to correct distortion caused by the imaging lens 16 is stored in the memory 26 in advance. As illustrated in FIG. 15, conversion information 324 includes lens information 324a indicating whether a conversion lens is present or absent or the types of a plurality of predetermined conversion lenses when the conversion lenses are mounted. In addition, in the conversion information 324, normal image conversion information 324b indicating a conversion parameter for correcting the distortion of a corresponding normal image 301 is associated with each conversion lens information item 324a. In the conversion information 324, split image conversion information 324c indicating a conversion parameter for correcting the distortion of a split image 300 is associated with each conversion lens information item 324a.

In the conversion parameter, similarly to the first embodiment, for a plurality of predetermined coordinates in the image to be corrected, coordinate values before conversion are associated with coordinate values after conversion. In addition, the conversion parameter of the split image 300 is used to convert the coordinates of each pixel in the split image 300 only in the orthogonal direction. The imaging device 100 corrects the distortion of each of the normal image 301 and the split image 300 using the conversion information 324. The plurality of conversion information 322, and 324 may be combined with each other to correct the distortion of each of the normal image 301 and the split image 300.

Third Embodiment

Hereinafter, an imaging device 100 according to a third embodiment will be described in detail with reference to the accompanying drawings.

In the first embodiment and the second embodiment, the conversion informations 320, 322, and 324 include the normal image conversion parameters and the split image conversion parameters. However, in the third embodiment, the conversion information does not include the split image conversion parameter and the split image conversion parameter is derived from the normal image conversion parameter.

Since the imaging device 100 according to the third embodiment has the same structure as the imaging device 100 according to the first embodiment, the description thereof will not be repeated in this embodiment.

In the imaging device 100 according to this embodiment, conversion information which is used to correct the distortion of an imaging lens 16 is stored in a memory 26 in advance. The conversion information according to this embodiment does not include the split image conversion parameter, as compared to the conversion information 320 illustrated in FIG. 8, the conversion information 322 illustrated in FIG. 13, or the conversion information 324 illustrated in FIG. 15.

Figure 16:
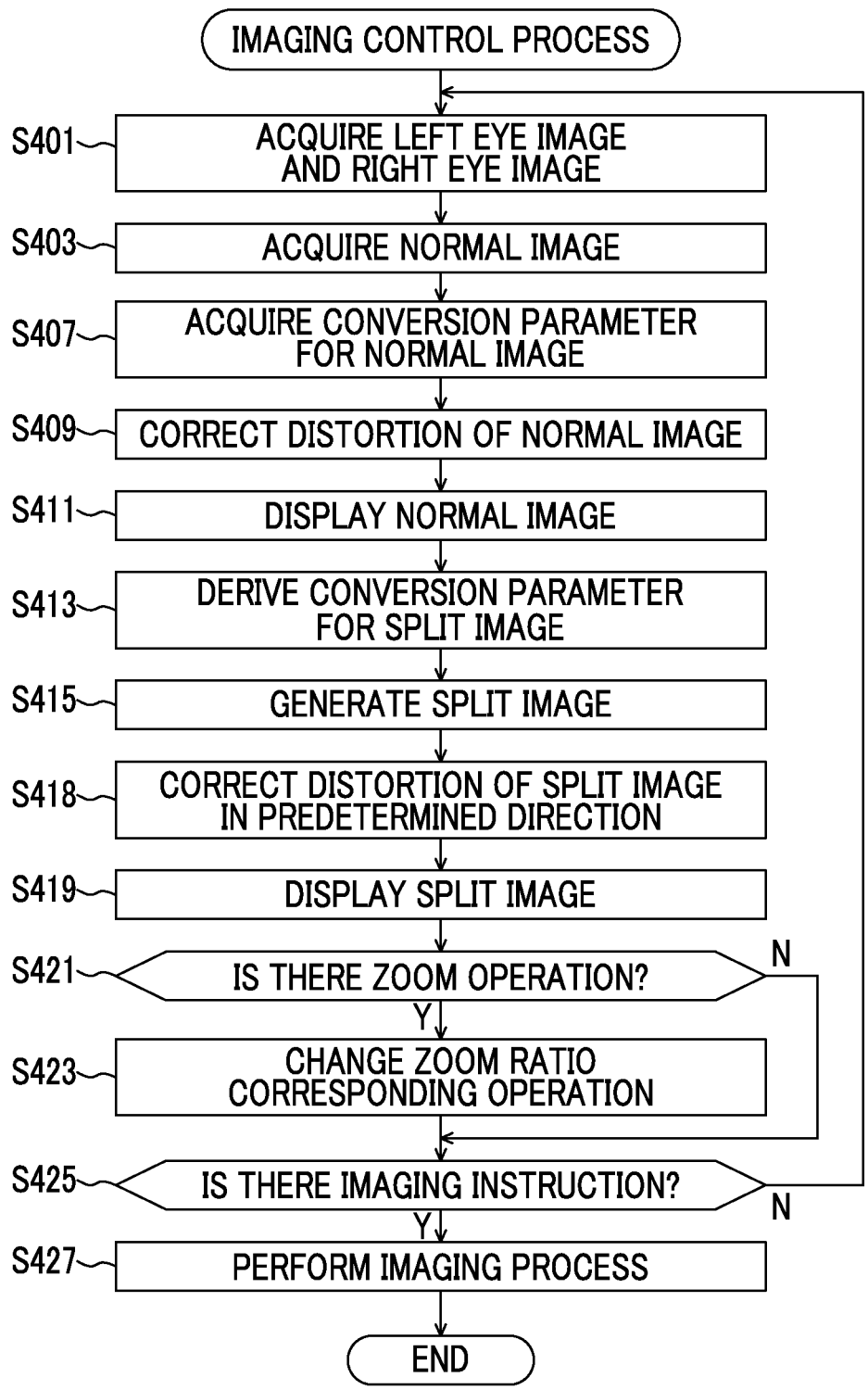
FIG. 16 is a flowchart illustrating the flow of the process of an imaging control processing program according to the third embodiment.

Next, the operation of the imaging device 100 when an imaging control process according to this embodiment is performed will be described with reference to FIG. 16. FIG. 16 is a flowchart illustrating the flow of the process of an imaging control processing program executed by a CPU 12 of the imaging device 100 at that time. The program is stored in a predetermined area of a ROM of the memory 26.

The same steps as those in the imaging control process according to the first and second embodiments are denoted by the same step numbers and the description thereof will not be repeated.

In the third embodiment, after Step S415 is performed, the CPU 12 proceeds to Step S418, derives a split image conversion parameter, and proceeds to Step S419. In the imaging device 100 according to this embodiment, the CPU 12 uses a conversion parameter related to correction in the orthogonal direction among the normal image conversion parameters in the conversion information as the split image conversion parameter. In this way, the CPU 12 derives the split image conversion parameter.

Figure 17:
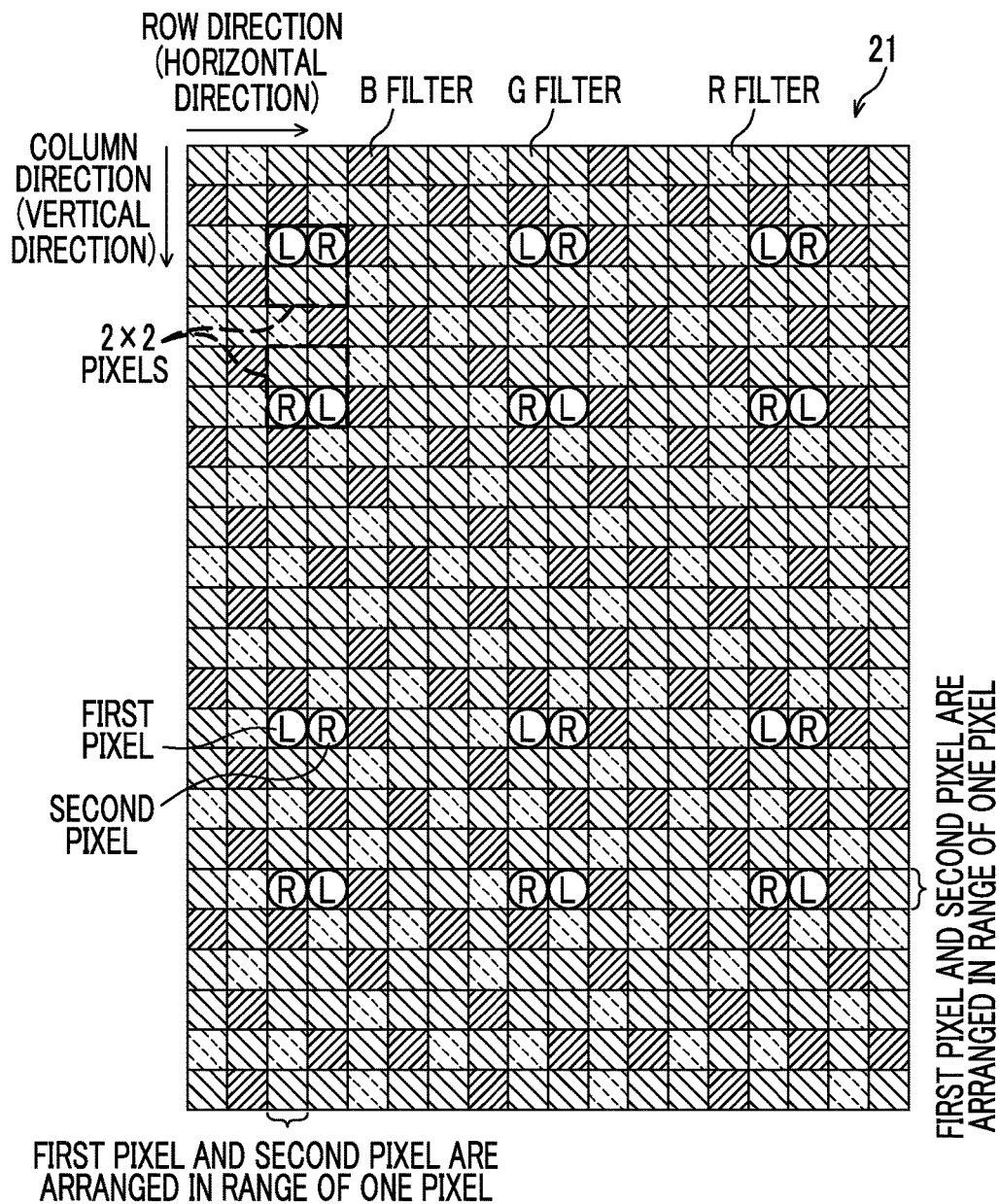
FIG. 17 is a schematic diagram illustrating an example of the array of color filters and the arrangement of light shielding members in the imaging element of the imaging device according to the embodiment.
Figure 18:
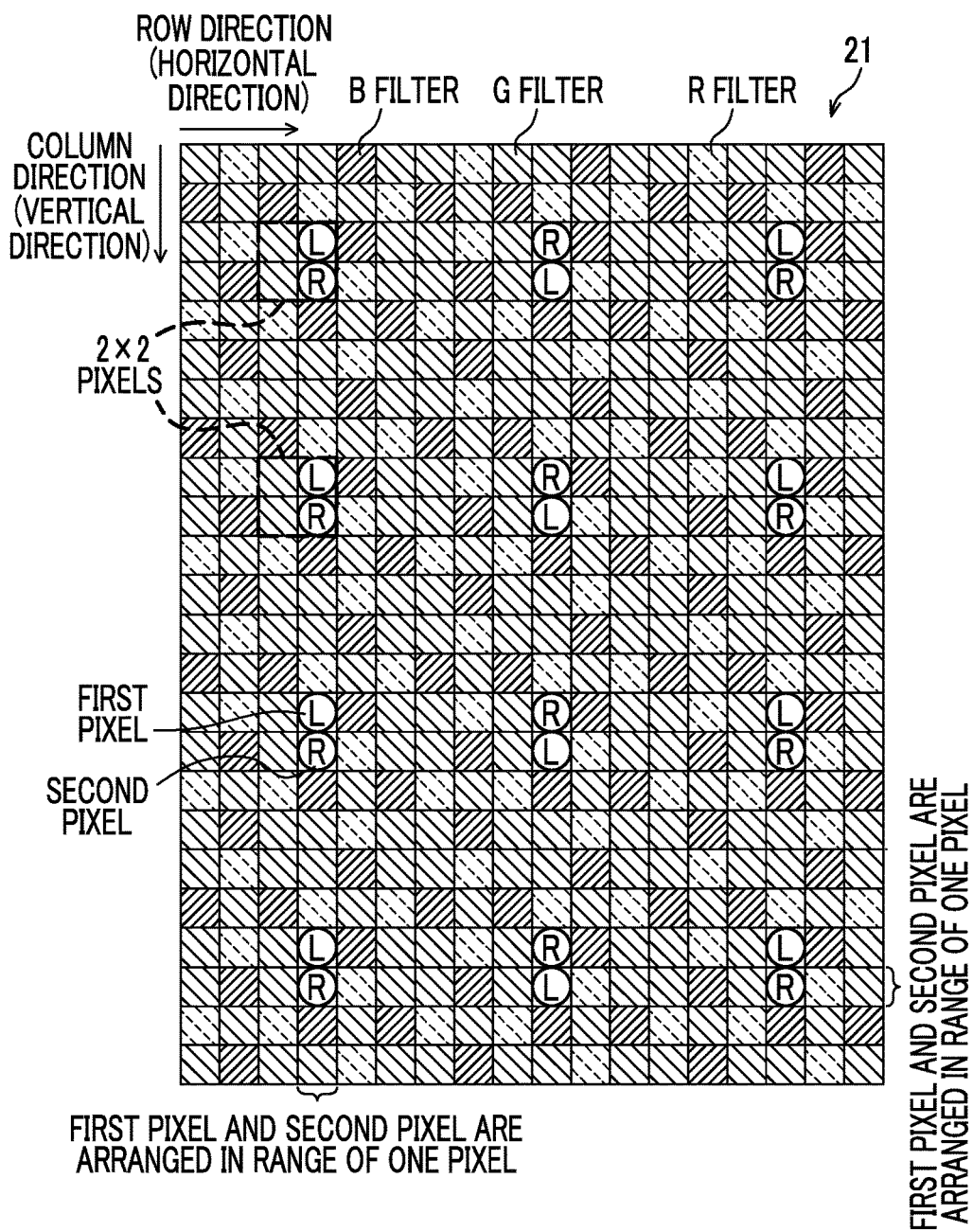
FIG. 18 is a schematic diagram illustrating an example of the array of color filters and the arrangement of light shielding members in the imaging element of the imaging device according to the embodiment.

In the first to third embodiments, a single phase difference pixel is provided in the G filters of the 2×2 pixels. However, the invention is not limited thereto. For example, a pair of a first pixel L and a second pixel R may be provided in the G filters of the 2×2 pixels. For example, as illustrated in FIG. 17, a pair of the first pixel L and the second pixel R which are adjacent to each other in a row direction may be provided in the G filters of the 2×2 pixels. In addition, for example, as illustrated in FIG. 18, a pair of the first pixel L and the second pixel R which are adjacent to each other in a column direction may be provided in the G filters of the 2×2 pixels. In any case, as described in the first embodiment, it is preferable that the first pixel L and the second pixel R are arranged in the range of a predetermined number of pixels in at least one of the column direction and the row direction in a first pixel group and a second pixel group. FIGS. 17 and 18 illustrate an example in which the first pixel L and the second pixel R are arranged so as to be located in the range of one pixel in each of the column direction and the row direction in the first pixel group and the second pixel group.

Figure 19:
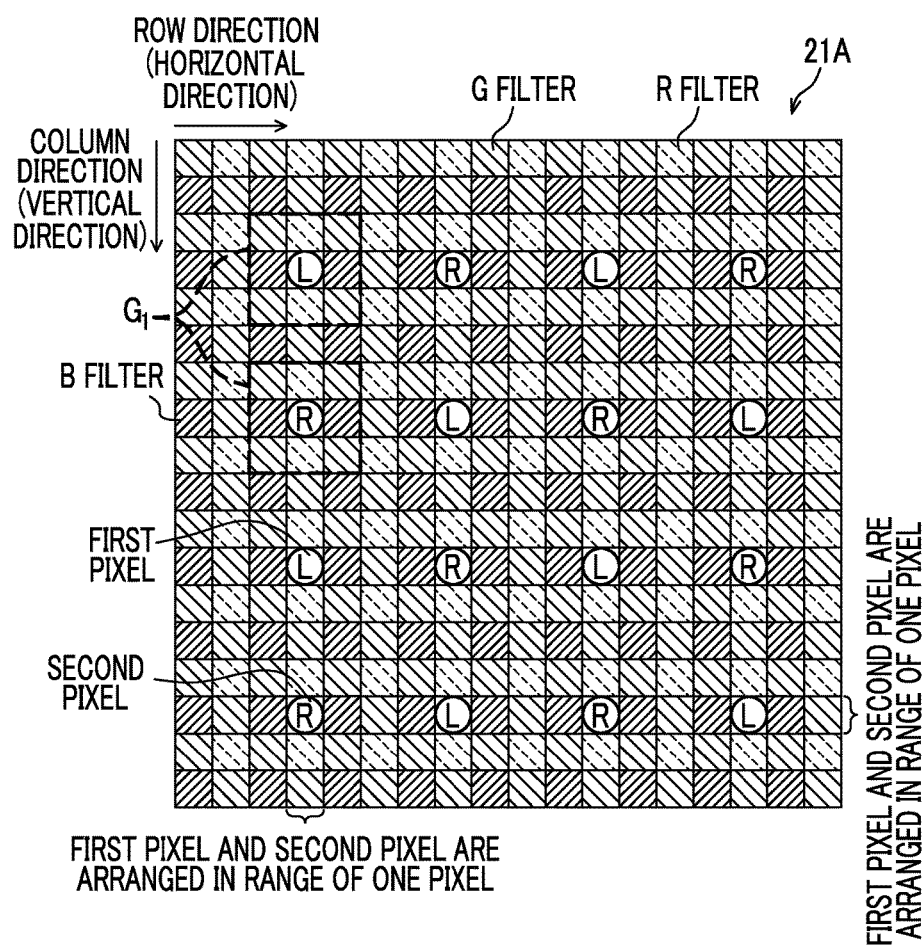
FIG. 19 is a schematic diagram illustrating an example of the array of color filters and the arrangement of light shielding members in the imaging element of the imaging device according to the embodiment.
Figure 20:
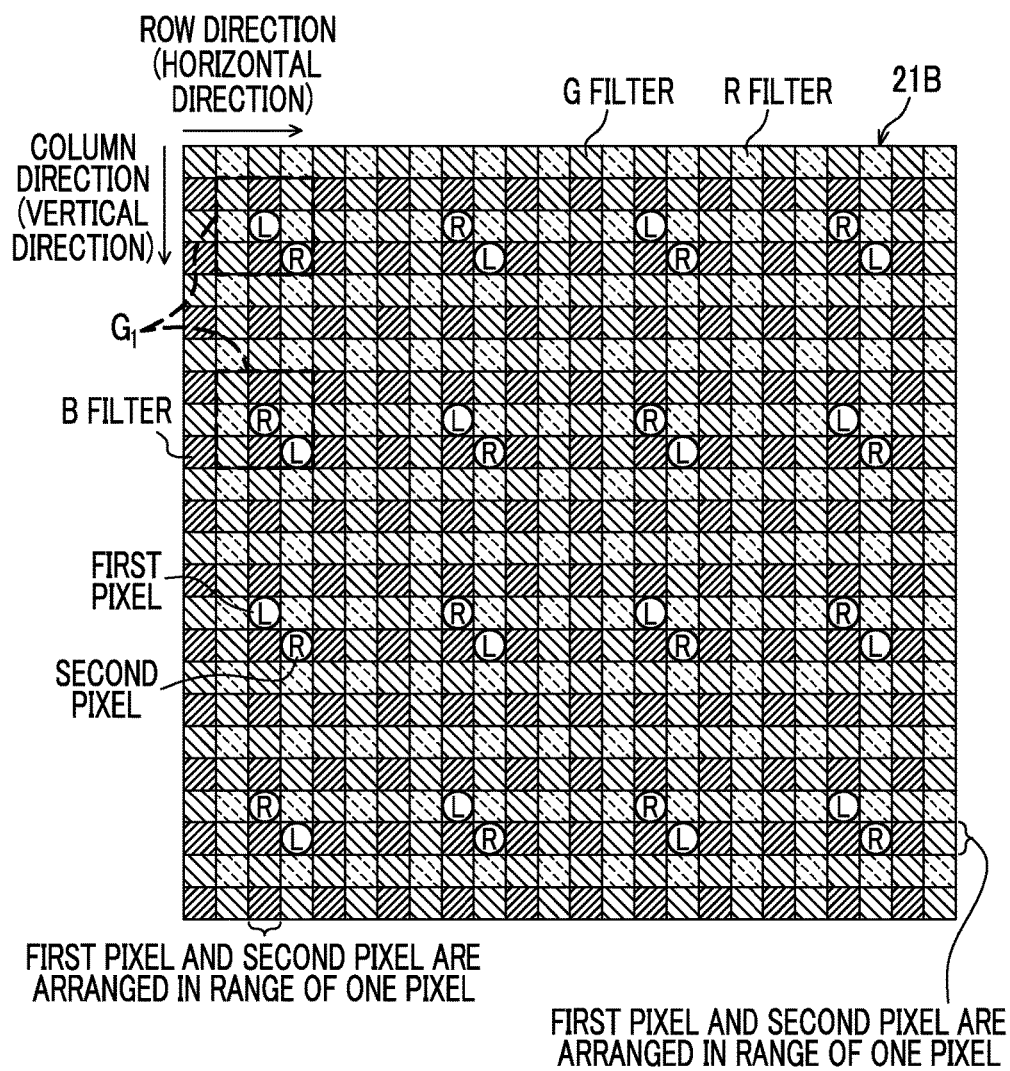
FIG. 20 is a schematic diagram illustrating an example of the array of color filters and the arrangement of light shielding members in the imaging element of the imaging device according to the embodiment.
Figure 21:
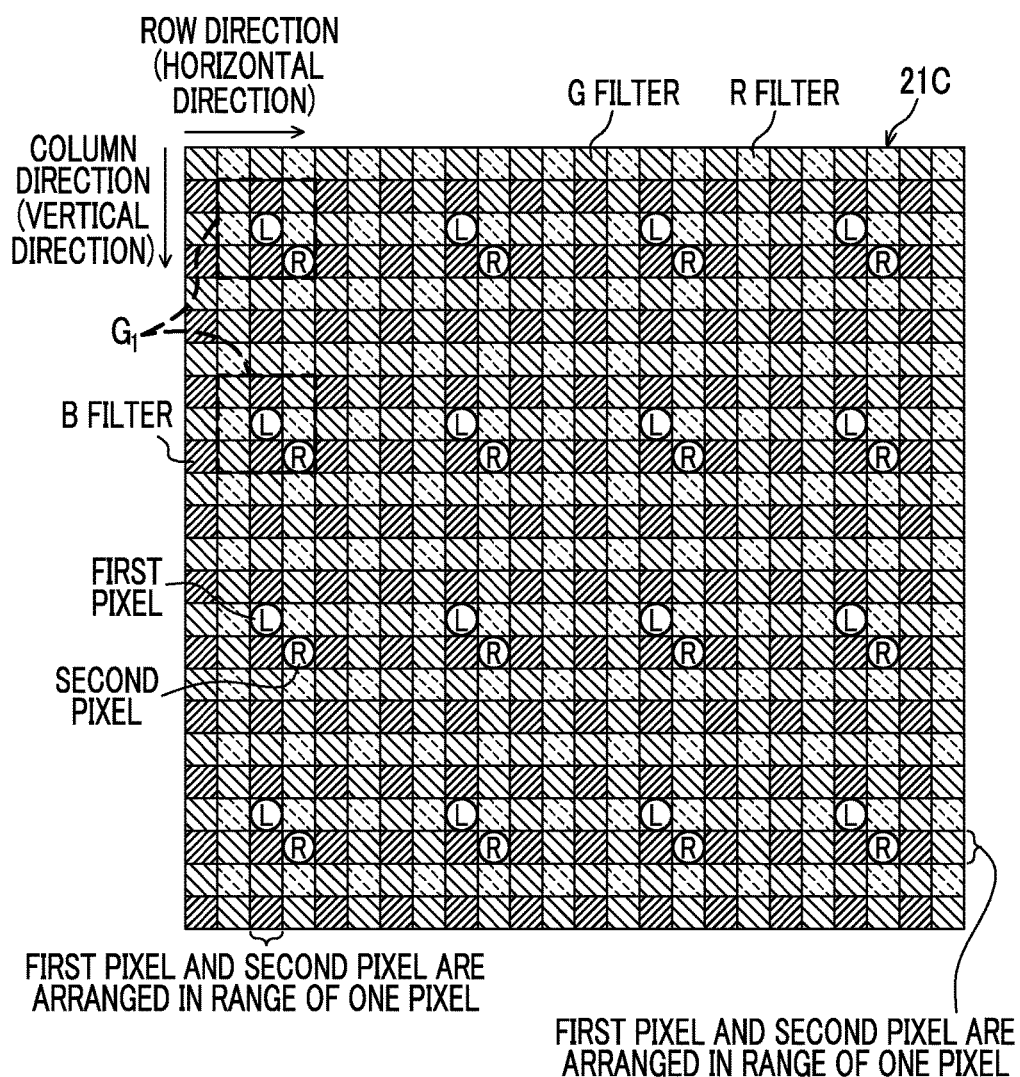
FIG. 21 is a schematic diagram illustrating an example of the array of color filters and the arrangement of light shielding members in the imaging element of the imaging device according to the embodiment.

In the first to third embodiments, the color filter 21 has a basic array pattern C. However, the invention is not limited thereto. For example, as illustrated in FIGS. 19 to 21, the primary colors of color filters (an R filter, a G filter, and a B filter) may be arranged in a Bayer array. In the examples illustrated in FIGS. 19 to 21, the phase difference pixel is provided for the G filter.

For example, in a color filter 21A illustrated in FIG. 19, the phase difference pixel is arranged at the center of an array pattern G1 in which the G filters are provided at four corners and the center of a square matrix of 3×3 pixels. In addition, the first pixel L and the second pixel R are alternately arranged in the row direction and the column direction, with the G filter corresponding to one pixel interposed therebetween (such that the G filter corresponding to one pixel is interposed between the first pixel L and the second pixel R). In addition, the first pixel L and the second pixel R are arranged so as to be located in the range of one pixel in the column direction and the row direction in the first pixel group and the second pixel group. According to this structure, an image based on the phase difference pixel which is provided at the center of the array pattern G1 can be interpolated using an image based on the normal pixels which are provided at four corners of the array pattern G1. Therefore, it is possible to improve the accuracy of interpolation, as compared to a structure without the structure according to the invention.

In addition, the array patterns G1 do not overlap each other. That is, the first pixel L and the second pixel R are arranged at the position where the pixels included in the first and second images that are interpolated using the third image based on the pixels which are included in the third pixel group and are adjacent to each pixel included in the first and second pixel groups do not overlap each other in the unit of pixels. Therefore, it is possible to prevent an image based on a phase difference pixel from being interpolated using an image based on the normal pixels which are used to interpolate an image based on another phase difference pixel. Therefore, the accuracy of interpolation is expected to be further improved.

For example, in a color filter 21B illustrated in FIG. 20, the phase difference pixels are arranged at the center and the lower right corner in the front view of FIG. 20 in an array pattern G1. In addition, the first pixel L and the second pixel R are alternately arranged in the row direction and the column direction, with the G filters corresponding to two pixels interposed therebetween (such that the G filters corresponding to two pixels are interposed between the first pixel L and the second pixel R). Therefore, the first pixel L and the second pixel R are arranged so as to be located in the range of one pixel in the column direction and the row direction in the first pixel group and the second pixel group. The first pixel L and the second pixel R can be adjacent to each other. As a result, it is possible to prevent the occurrence of image deviation caused by factors other than defocus.

In addition, since the normal pixels provided with the filters (G filters) of the same color are adjacent to each phase difference pixel, it is possible to improve the accuracy of interpolation. The array patterns G1 do not overlap each other. That is, the first pixel L and the second pixel R are arranged at the position where each pair of pixels included in the first and second images that are interpolated using the third image based on the pixels which are included in the third pixel group and are adjacent to each pixel included in the first and second pixel groups do not overlap each other in the unit of pixels. Here, the term "pair of pixels" indicates, for example, the first pixel L and the second pixel R (a pair of phase difference pixels) included in each array pattern G1. Therefore, it is possible to prevent an image based on a pair of phase difference pixels from being interpolated with an image based on the normal pixels which are used to interpolate an image based on another pair of phase difference pixels. Therefore, the accuracy of interpolation is expected to be further improved.

For example, in a color filter 21C illustrated in FIG. 21, the first pixel L is arranged at the center of an array pattern G1 and the second pixel R is arranged at the lower right corner in the front view of FIG. 21. In addition, the first pixels L are arranged in the row direction and the column direction, with the G filters corresponding to two pixels interposed therebetween, and the second pixels R are arranged in the row direction and the column direction, with the G filters corresponding to two pixels interposed therebetween. Therefore, the first pixel L and the second pixel R are arranged so as to be located in the range of two pixels in the column direction and the row direction in the first pixel group and the second pixel group. The first pixel L and the second pixel R can be adjacent to each other. As a result, it is possible to prevent the occurrence of image deviation caused by factors other than defocus.

In addition, in the example illustrated in FIG. 21, similarly to the example illustrated in FIG. 20, the array patterns G1 do not overlap each other. Therefore, it is possible to prevent an image based on a phase difference pixel from being interpolated with an image based on the normal pixels which are used to interpolate an image based on another phase difference pixel. Therefore, the accuracy of interpolation is expected to be further improved.

Figure 22:
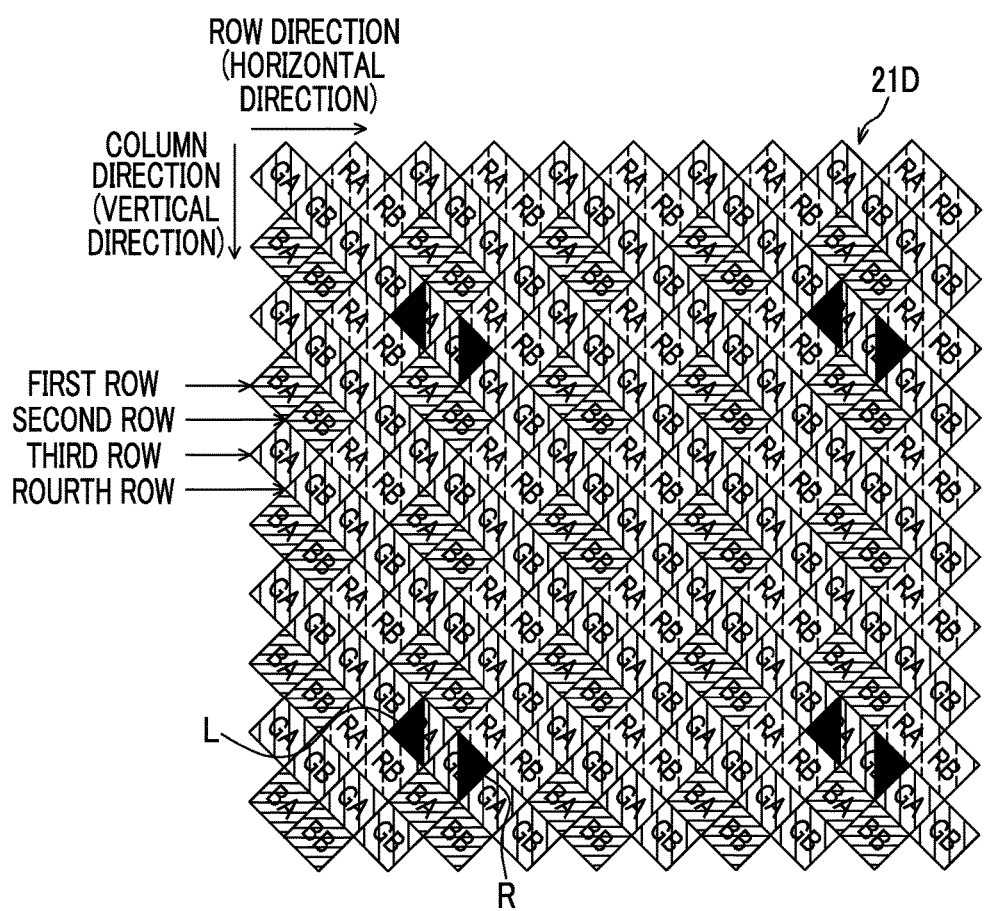
FIG. 22 is a schematic diagram illustrating an example of the array of color filters and the arrangement of light shielding members in the imaging element of the imaging device according to the embodiment.

For example, a color filter 21D illustrated in FIG. 22 is given as another example of the structure of the color filter. FIG. 22 schematically illustrates an example of the array of the primary colors (an R filter, a G filter, and a B filter) of the color filter 21D and the arrangement of light shielding members in the imaging element 20. In the color filter 21D illustrated in FIG. 22, first to fourth rows are repeatedly arranged in the column direction. The first row means a row in which the B filter and the G filter are alternately arranged in the row direction. The second row means a row which is shifted from the first row by a half pitch (a distance corresponding to half of the pixel) in the row direction. The third row means a row in which the G filter and the R filter are alternately arranged in the row direction. The fourth row means a row which is shifted from the third row by a half pitch in the row direction.

The first row and the second row are adjacent to each other so as to be shifted by a half pitch in the column direction. The second row and the third row are adjacent to each other so as to be shifted by a half pitch in the column direction. The third row and the fourth row are adjacent to each other so as to be shifted by a half pitch in the column direction. The fourth row and the first row are adjacent to each other so as to be shifted by a half pitch in the column direction. Therefore, the first to fourth rows repeatedly appear every two pixels in the column direction.

For example, as illustrated in FIG. 22, the first pixel L and the second pixel R are allocated to the third and fourth rows, respectively. That is, the first pixel L is allocated to the third row and the second pixel R is allocated to the fourth row. The first pixel L and the second pixel R form a pair and are arranged adjacent to each other (at the minimum pitch). In addition, in the example illustrated in FIG. 23, the first pixel L is allocated to every six pixels in the row direction and the column direction and the second pixel R is allocated to every six pixels in the row direction and the column direction. According to this structure, the phase difference between the first pixel group and the second pixel group is calculated with high accuracy, as compared to a structure without the structure according to the invention.

In the example illustrated in FIG. 22, the G filter is allocated to the first pixel L and the second pixel R. Since the pixel provided with the G filter has a higher sensitivity than pixels provided with the filters of the other colors, it is possible to improve the accuracy of interpolation. In addition, since the G filter has continuity as compared to the filters of the other colors, the pixel provided with the G filter is easier to interpolate than the pixels provided with the filters of the other colors.

In the first embodiment, the split image is divided into two images in the up-down direction. However, the invention is not limited thereto. The split image may be divided into a plurality of images in the left-right direction or the oblique direction.

Figure 23:
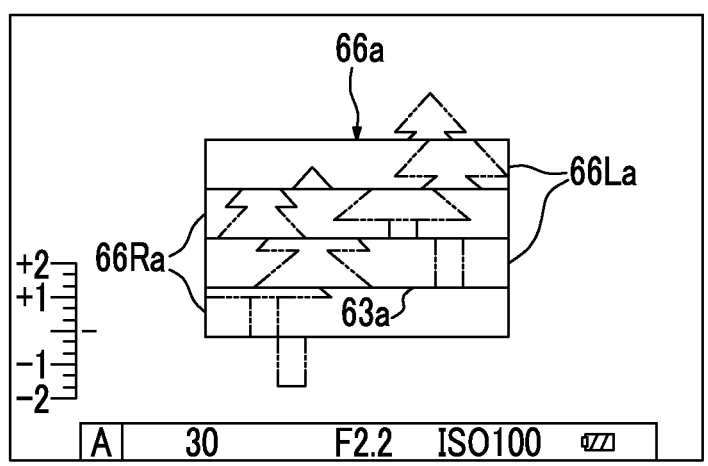
FIG. 23 is a front view illustrating an example of a method for dividing a display region of the split image according to the embodiment.

For example, a split image 66a illustrated in FIG. 23 is divided into odd-numbered lines and even-numbered lines by a plurality of interface lines 63a which are parallel to each other in the row direction. In the split image 66a, a linear (for example, a strip-shaped) phase difference image 66La which is generated on the basis of an output signal from the first pixel group is displayed in the odd-numbered line (can also be displayed in the even-numbered line). In addition, a linear (for example, a strip-shaped) phase difference image 66Ra which is generated on the basis of an output signal from the second pixel group is displayed in the even-numbered line.

Figure 24:
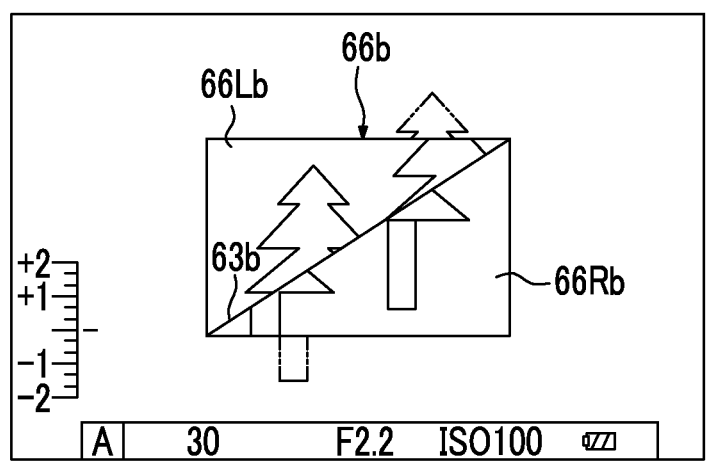
FIG. 24 is a front view illustrating an example of the method for dividing the display region of the split image according to the embodiment.

A split image 66b illustrated in FIG. 24 is divided into two images by an interface line 63b (for example, a diagonal line of the split image 66b) which is inclined in the row direction. In the split image 66b, a phase difference image 66Lb which is generated on the basis of an output signal from the first pixel group is displayed in one region. In addition, a phase difference image 66Rb which is generated on the basis of an output signal from the second pixel group is displayed in the other region.

Figure 25A:
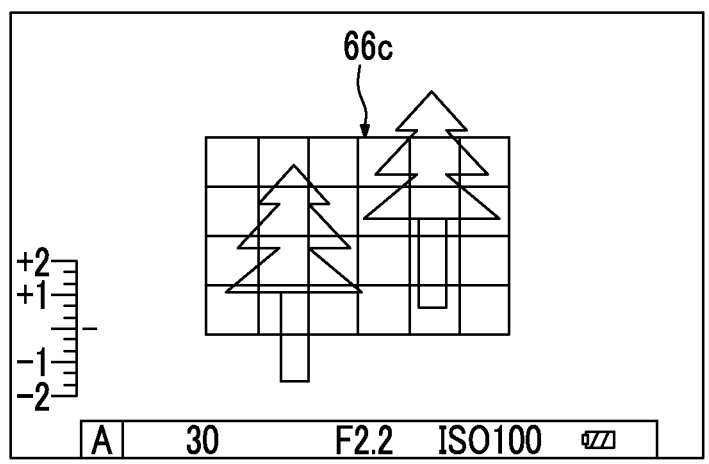
FIG. 25A is a front view illustrating an example of the method for dividing the display region of the split image according to the embodiment.
Figure 25B:
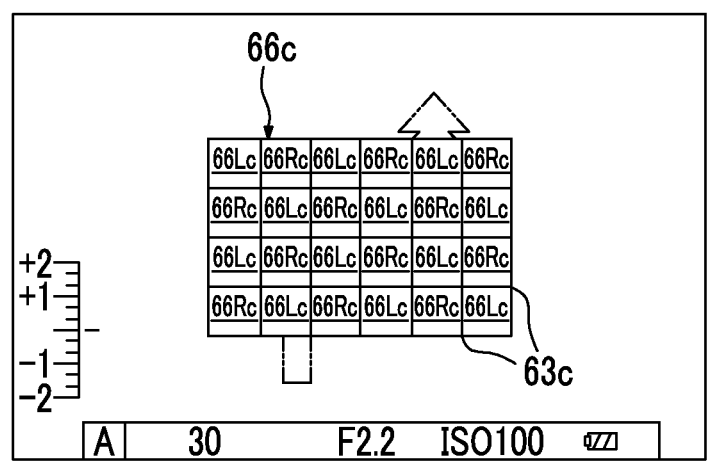
FIG. 25B is a front view illustrating an example of the method for dividing the display region of the split image according to the embodiment.

A split image 66c illustrated in FIGS. 25A and 25B is divided by lattice-shaped interface lines 63c which are parallel in the row direction and the column direction. In the split image 66c, phase difference images 66Lc which are generated on the basis of an output signal from the first pixel group are arranged in a checker pattern and then displayed. In addition, phase difference images 66Rc which are generated on the basis of an output signal from the second pixel group are arranged in a checker pattern and then displayed.

The split image is not limited thereto. A different focus check image may be generated from two phase difference images and then displayed. For example, two phase difference images may be superimposed and a composite image may be displayed. When the image is out of focus, it is displayed as a double image. When the image is in focus, it is clearly displayed.

The flow of the imaging control process described in the first to third embodiments is an illustrative example. Therefore, unnecessary steps may be removed, new steps may be added, or the order of the process may be changed, without departing from the scope and spirit of the invention. In addition, each process included in the image generation and output process described in the first to third embodiments may be implemented by a software configuration obtained by the execution of a program by a computer or hardware configuration. Furthermore, each process may be implemented by a combination of the hardware configuration and the software configuration.

When the computer executes the program to implement the imaging control process described in the first to third embodiments, the program may be stored in a predetermined storage area (for example, the memory 26) in advance.

However, the program is not necessarily stored in the memory 26 at the beginning. For example, the program may be stored in an arbitrary "portable storage medium", such as a solid state drive (SSD), a CD-ROM, a DVD disk, a magneto-optical disk, or an IC card which is connected to the computer and is then used, in advance. Then, the computer may acquire the program from the portable storage medium and execute the program. In addition, each program may be stored in another computer or a server apparatus connected to the computer through, for example, the Internet or a local area network (LAN) and the computer may acquire the program and execute the program.

Fourth Embodiment

In the first to third embodiments, the imaging device 100 is given as an example. However, for example, a mobile phone, a smart phone, a personal digital assistant (PDA), or a portable game machine with a camera function is given as an example of a mobile terminal apparatus which is a modification example of the imaging device 100. Hereinafter, the smart phone will be described in detail as an example with reference to the drawings.

Figure 26:
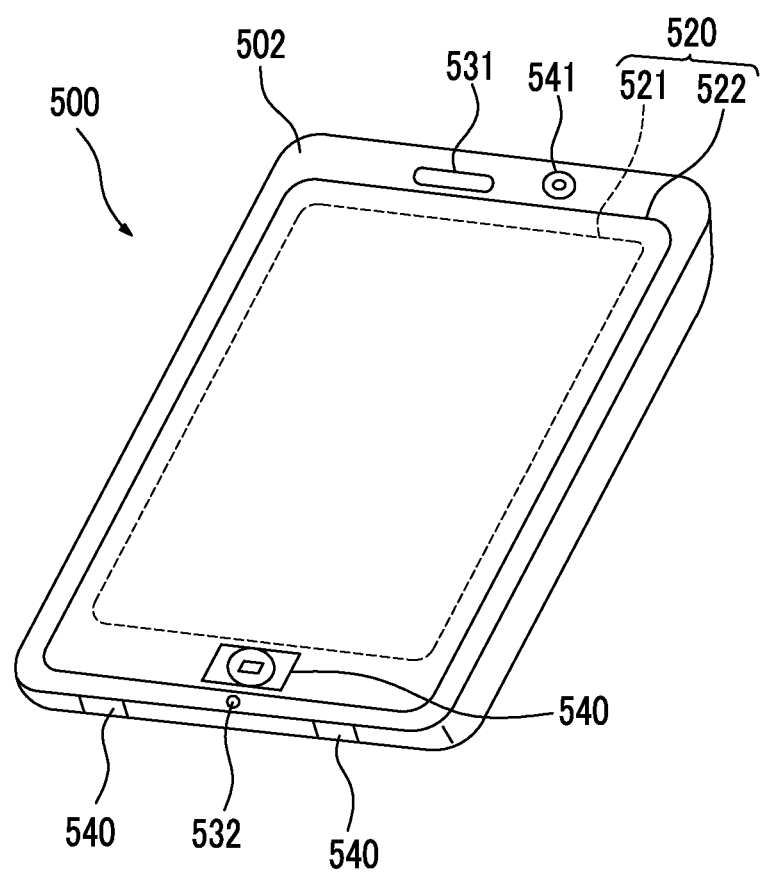
FIG. 26 is a perspective view illustrating an example of the outward appearance of a smart phone according to a fourth embodiment.

FIG. 26 illustrates an example of the outward appearance of a smart phone 500. The smart phone 500 illustrated in FIG. 26 includes a housing 502 with a flat panel shape and a display input unit 520 having a display panel 521 as a display unit and an operation panel 522 as an input unit which are integrally formed on one surface of the housing 502. The housing 502 includes a speaker 531, a microphone 532, an operating unit 540, and a camera unit 541. However, the configuration of the housing 502 is not limited thereto. For example, the display unit and the input unit may be independently provided, or the housing 502 may have a folding structure or a sliding mechanism.

Figure 27:
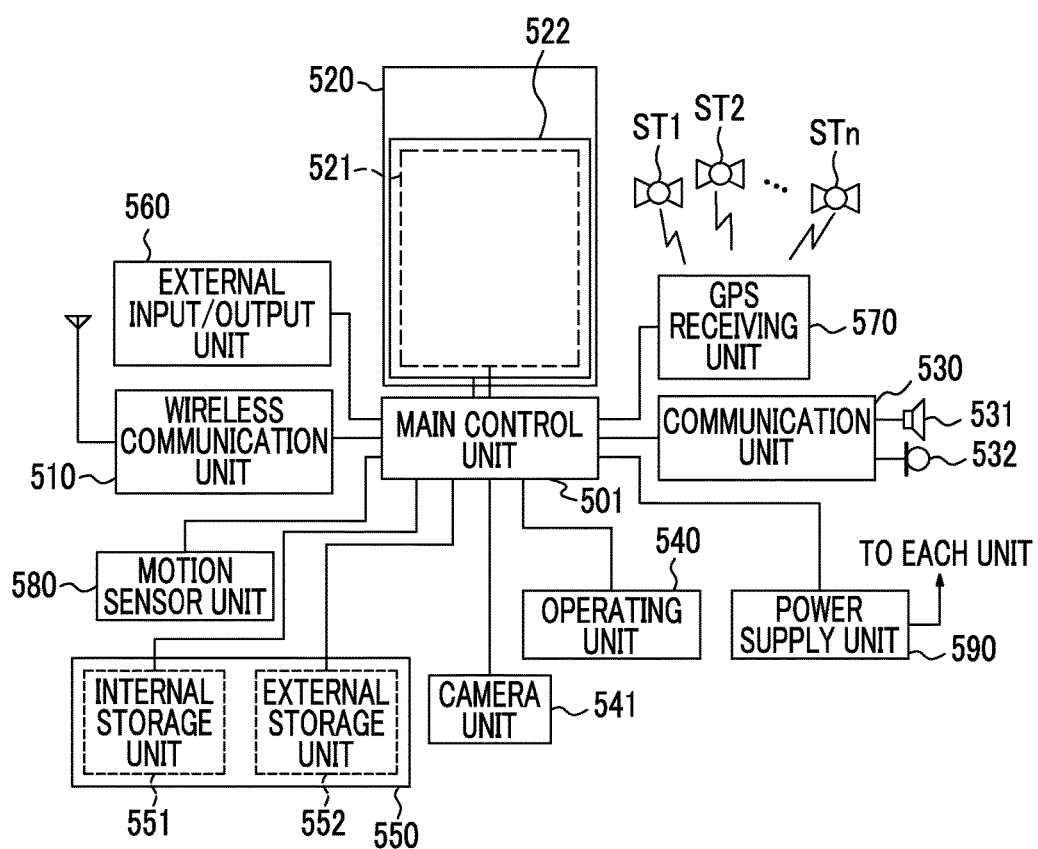
FIG. 27 is a block diagram illustrating an example of the structure of a main portion of an electrical system of the smart phone according to the fourth embodiment.

FIG. 27 is a block diagram illustrating an example of the structure of the smart phone 500 illustrated in FIG. 26. As illustrated in FIG. 27, the smart phone 500 includes, as main components, a wireless communication unit 510, the display input unit 520, a calling unit 530, the operating unit 540, the camera unit 541, a storage unit 550, and an external input/output unit 560. In addition, the smart phone 500 includes, as main components, a global positioning system (GPS) receiving unit 570, a motion sensor unit 580, a power supply unit 590, and a main control unit 501. The smart phone 500 has, as a main function, a wireless communication function which performs mobile wireless communication through a base station apparatus and a mobile communication network.

The wireless communication unit 510 performs wireless communication with the base station apparatus which is accommodated in the mobile communication network in response to an instruction from the main control unit 501. The wireless communication is used to transmit and receive various types of file data, such as voice data and image data, and electronic mail data or to receive, for example, web data and streaming data.

The display input unit 520 is a so-called touch panel and includes the display panel 521 and the operation panel 522. Therefore, the display input unit 520 displays, for example, images (still images and moving images) or text information to visually transmit information to the user and detects a user operation for the displayed information under the control of the main control unit 501. It is preferable that the display panel 521 is a 3D display panel when a generated 3D image is viewed.

The display panel 521 uses, for example, a liquid crystal display (LCD) or an organic electro-luminescence display (OELD) as a display device. The operation panel 522 is a device that is provided such that an image displayed on a display surface of the display panel 521 is visually recognized and detects one or a plurality of coordinates operated by a finger of the user or a stylus. When the device is operated by a finger of the user or a stylus, a detection signal which is generated by the operation is output to the main control unit 501. Then, the main control unit 501 detects an operation position (coordinates) on the display panel 521 on the basis of the received detection signal.

As illustrated in FIG. 26, the display panel 521 and the operation panel 522 of the smart phone 500 are integrated to form the display input unit 520 and the operation panel 522 is arranged so as to completely cover the display panel 521. When this arrangement is used, the operation panel 522 may have a function of detecting the user's operation in a region other than the display panel 521. In other words, the operation panel 522 may include a detection region (hereinafter, referred to as a display region) for an overlap portion which overlaps the display panel 521 and a detection region (hereinafter, referred to as a non-display region) for an outer edge portion which does not overlap the display panel 521.

The size of the display region may be exactly equal to the size of the display panel 521. However, the sizes are not necessarily equal to each other. The operation panel 522 may include two sensitive regions, that is, an outer edge portion and an inner portion other than the outer edge portion. The width of the outer edge portion is appropriately designed according to the size of the housing 502. Examples of a position detecting method which is used in the operation panel 522 include a matrix switching method, a resistive layer method, a surface elastic wave method, an infrared method, an electromagnetic induction method, and a capacitive sensing method. Any method may be used.

The calling unit 530 includes the speaker 531 and the microphone 532. The calling unit 530 converts the voice of the user which is input through the microphone 532 into voice data which can be processed by the main control unit 501 and outputs the converted voice data to the main control unit 501. In addition, the calling unit 530 decodes voice data received by the wireless communication unit 510 or the external input/output unit 560 and outputs the decoded voice data from the speaker 531. As illustrated in FIG. 26, for example, the speaker 531 can be mounted on the same surface as the display input unit 520 and the microphone 532 can be mounted on a side surface of the housing 502.

The operating unit 540 is a hardware key which uses, for example, a key switch and receives instructions from the user. For example, as illustrated in FIG. 26, the operating unit 540 is a push button switch which is mounted on the side surface of the housing 502 of the smart phone 500, is turned on when it is pressed by, for example, a finger, and is turned off by the restoring force of a spring when the finger is taken off.

The storage unit 550 stores a control program or control data of the main control unit 501, application software, address data which is associated with, for example, the names or phone numbers of communication partners, and transmitted and received electronic mail data. In addition, the storage unit 550 stores web data which is downloaded by web browsing or downloaded content data. In addition, the storage unit 550 temporally stores, for example, streaming data. The storage unit 550 includes an internal storage unit 551 which is provided in the smart phone and an external storage unit 552 which has a detachable external memory slot. The internal storage unit 551 and the external storage unit 552 forming the storage unit 550 may be implemented by a storage medium, such as a flash memory or a hard disk. Examples of the storage medium can include a multimedia-card-micro-type memory, a card-type memory (for example, a MicroSD (registered trademark) memory), a random access memory (RAM), and a read only memory (ROM).

The external input/output unit 560 functions as an interface with all external apparatuses which are connected to the smart phone 500 and is directly or indirectly connected to other external apparatuses by communication or a network. Examples of the communication with other external apparatuses include universal serial bus (USB) communication and IEEE1394. Examples of the network includes the Internet, a wireless LAN, a Bluetooth (registered trademark) network, a radio frequency identification (RFID) network, and an infrared data association (IrDA (registered trademark)) network. In addition, other examples of the network include an ultra wideband (UWB: registered trademark) network and a ZigBee (registered trademark) network.

Examples of the external apparatus connected to the smart phone 500 include a wired/wireless headset, a wired/wireless external charger, a wired/wireless data port, and a memory card which is connected through a card socket. Other examples of the external apparatus include a subscriber identity module (SIM) card/user identity module (UIM) card and an external audio/video apparatus which is connected through an audio/video input/output (I/O) terminal. In addition to the external audio/video apparatus, a wirelessly connected external audio/video apparatus is given as an example of the external apparatus. For example, a smart phone which is connected wirelessly or in a wired manner, a personal computer which is connected wirelessly or in a wired manner, a PDA which is connected wirelessly or in a wired manner, and an earphone can be applied, instead of the external audio/video apparatus.

The external input/output unit can transmit data which is received from the external apparatus to each component of the smart phone 500 or can transmit the data in the smart phone 500 to the external apparatus.

The GPS receiving unit 570 receives GPS signals transmitted from GPS satellites ST1 to STn and performs a position measurement process on the basis of the received GPS signals to detect a position including the latitude, longitude, and height of the smart phone 500, in response to an instruction from the main control unit 501. When the GPS receiving unit 570 can acquire positional information from the wireless communication unit 510 or the external input/output unit 560 (for example, the wireless LAN), it can detect the position using the positional information.

The motion sensor unit 580 includes, for example, a triaxial acceleration sensor and detects the physical movement of the smart phone 500 in response to an instruction from the main control unit 501. When the physical movement of the smart phone 500 is detected, the moving direction or acceleration of the smart phone 500 is detected. The detection result is output to the main control unit 501.

The power supply unit 590 supplies power which is stored in a battery (not illustrated) to each unit of the smart phone 500 in response to an instruction from the main control unit 501.

The main control unit 501 includes a microprocessor, operates on the basis of the control program or control data stored in the storage unit 550, and controls the overall operation of each unit of the smart phone 500. The main control unit 501 has an application processing function and a mobile communication control function of controlling each unit of a communication system in order to perform voice communication or data communication through the wireless communication unit 510.

The application processing function is implemented by the operation of the main control unit 501 based on the application software which is stored in the storage unit 550. Examples of the application processing function include an infrared communication function which controls the external input/output unit 560 such that data communication with an opposing apparatus is performed, an electronic mail function which transmits and receives electronic mail, and a web browsing function which browses web pages.

The main control unit 501 has, for example, an image processing function which displays an image on the display input unit 520 on the basis of image data (still image or moving image data) such as received data or downloaded streaming data. The image processing function means the function of the main control unit 501 decoding the image data, performing image processing on the decoding result, and displaying the image on the display input unit 520.

The main control unit 501 performs display control for the display panel 521 and operation detection control which detects the operation of the user through the operating unit 540 and the operation panel 522.

The main control unit 501 performs the display control to display a software key, such as an icon for starting application software or a scroll bar, or to display a window for creating electronic mail. The scroll bar means a software key for receiving an instruction to move a displayed portion of an image that is too large to fit into the display region of the display panel 521.

The main control unit 501 performs the operation detection control to detect the operation of the user input through the operating unit 540 or to receive an operation for the icon or the input of a character string to an input field of the window through the operation panel 522. In addition, the main control unit 501 performs the operation detection control to receive a request to scroll the displayed image through the scroll bar.

In addition, the main control unit 501 performs the operation detection control to determine whether the position of an operation for the operation panel 522 is an overlap portion (display region) which overlaps the display panel 521 or an outer edge portion (non-display region) which does not overlap the display panel 521 other than the overlap portion. The main control unit 501 has a touch panel control function that receives the determination result and controls a sensitive region of the operation panel 522 or the display position of the software key.

The main control unit 501 can detect a gesture operation for the operation panel 522 and can perform a predetermined function according to the detected gesture operation. The gesture operation does not mean a simple touch operation of the related art, but means an operation which draws a trace using a finger, an operation which designates a plurality of positions at the same time, or a combination thereof which draws a trace for at least one of the plurality of positions.

The camera unit 541 is a digital camera which captures an image using an imaging element, such as a CMOS or a CCD, and has the same functions as the imaging device 100 illustrated in FIG. 1.

The camera unit 541 can switch the operation mode between the manual focus mode and the automatic focus mode. When the manual focus mode is selected, the user can operate, for example, a focus icon button displayed on the operating unit 540 or the display input unit 520 to focus the imaging lens 16 of the camera unit 541. In the manual focus mode, a live view image having a split image combined therewith is displayed on the display panel 521 such that the user can check a focus state in the manual focus mode. In addition, the hybrid finder 220 illustrated in FIG. 6 may be provided in the smart phone 500.

The camera unit 541 converts captured image data into image data which is compressed in, for example, a joint photographic coding experts group (JPEG) format under the control of the main control unit 501 and records the converted image data in the storage unit 550 or outputs the converted image data through the external input/output unit 560 or the wireless communication unit 510. As illustrated in FIG. 26, the camera unit 541 is mounted on the same surface as the display input unit 520 in the smart phone 500. However, the mounting position of the camera unit 541 is not limited thereto. For example, the camera unit 541 may be mounted on the rear surface of the display input unit 520 or a plurality of camera units 541 may be mounted. When the plurality of camera units 541 are mounted, the camera units 541 which are used to capture images may be switched such that a single camera unit captures images or the plurality of camera units 541 may be simultaneously used to capture images.

The camera unit 541 can be used for various functions of the smart phone 500. For example, the image captured by the camera unit 541 can be displayed on the display panel 521 or the image captured by the camera unit 541 can be used as one of the operation inputs of the operation panel 522. When the GPS receiving unit 570 detects the position, the position may be detected with reference to the image from the camera unit 541. In addition, the optical axis direction of the camera unit 541 in the smart phone 500 may be determined or the current usage environment may be determined, with reference to the image from the camera unit 541, using the triaxial acceleration sensor or without using the triaxial acceleration sensor. Of course, the image from the camera unit 541 may be used in the application software.

For example, various kinds of information may be added to the image data of a still image or a moving image and the image data may be stored in the storage unit 550 or may be output through the external input/output unit 560 or the wireless communication unit 510. The "various kinds of information" include the positional information which is acquired by the GPS receiving unit 570 and the voice information which is acquired by the microphone 532 (for example, the main control unit may convert the voice information into text information using voice-text conversion). In addition, the "various kinds of information" include, for example, the posture information which is acquired by the motion sensor unit 580.

In each of the above-described embodiments, the imaging element 20 includes the first to third pixel groups. However, the invention is not limited thereto. For example, an imaging element may include only the first pixel group and the second pixel group. A digital camera including this type of imaging element can generate a three-dimensional image (3D image) on the basis of the first image output from the first pixel group and the second image output from the second pixel group and can also generate a two-dimensional image (2D image). In this case, the two-dimensional image can be generated by, for example, an interpolation process which is performed between the pixels of the same color in the first image and the second image. In addition, the first image or the second image may be used as the two-dimensional image, without performing the interpolation process.

In each of the above-described embodiments, the split image 300 is displayed in the display region of the normal image 301. However, the invention is not limited thereto. For example, the normal image 301 may not be displayed on the display device, but the split image 300 may be displayed on the display device. In addition, in each of the above-described embodiments, the split image 300 is displayed in a portion of the display region of the display device. However, the invention is not limited thereto. For example, the split image 300 may be displayed in the entire display region of the display device. As such, the invention is not limited to the aspect in which both the normal image 301 and the split image 300 are simultaneously displayed on the same screen of the display device. For example, in the invention, when the display of the split image 300 is instructed and an instruction to display the normal image 301 is cancelled, the display control unit 36 may control the display device such that the normal image 301 is not displayed and the split image 300 is displayed.

What is claimed is:

1. An image processing device comprising:
   a display unit that displays an image;
   at least one processor configured to perform,
   generating a first display image on the basis of an image signal output from an imaging element including first and second pixel groups on which an object image that passes through first and second regions of an imaging lens and is pupil-divided is formed, and generates, on the basis of first and second images based on image signals output from the first and second pixel groups, a second display image that is used to check a focus and includes a first divided image which is a portion of a plurality of divided images obtained by dividing the first image in a predetermined division direction and a second divided image which is a portion of a plurality of divided images obtained by dividing the second image in the division direction and is arranged in a divided region other than a divided region corresponding to the first divided image,
   controlling the display unit such that the first display image is displayed and the second display image is displayed in a display region of the first display image, and
   correcting distortion of the first display image caused by the imaging lens, corrects distortion of the second display image in the division direction, and does not correct the distortion of the second display image in a direction orthogonal to the division direction.

2. The image processing device according to claim 1, wherein the imaging lens is a zoom lens, and
   the processor is further configured to perform correcting the distortion according to a focal length of the zoom lens.

3. The image processing device according to claim 1, wherein the processor is further configured to perform correcting the distortion according to an aperture value of the imaging lens.

4. The image processing device according to claim 1, further comprising:
   a mount that is used to interchangeably mount any one of a plurality of the imaging lenses on a device body; and
   wherein the processor is further configured to perform
   acquiring information indicating the type of imaging lens mounted by the mount, and
   correcting the distortion according to the type of imaging lens indicated by the information.

5. The image processing device according to claim 1, further comprising:
a storage medium that stores conversion information related to coordinate conversion for correcting the distortion in advance,
wherein the processor is configured to perform correcting the distortion on the basis of the conversion information stored in the storage medium.

6. The image processing device according to claim 5, wherein the conversion information is at least one of information indicating a coordinate conversion table in which the coordinates of a plurality of pixels before the distortion is corrected are associated with the coordinates of the plurality of pixels after the distortion is corrected and an arithmetic expression for converting the coordinates before the correction into the coordinates after the correction.

7. The image processing device according to claim 1, further comprising:
a storage medium that stores conversion information related to coordinate conversion for correcting the distortion of the first display image in advance; and
the processor is further configured to perform
deriving second conversion information related to coordinate conversion for correcting the distortion of the second display image from the conversion information stored in the storage medium, and
correcting the distortion on the basis of the conversion information stored in the storage medium and the second conversion information.

8. The image processing device according to claim 1, wherein the processor is configured to perform control such that the second display image is displayed in a central portion of the first display image in the division direction.

9. An image processing device comprising:
a display unit that displays an image;
at least one processor configured to perform,
generating a first display image on the basis of an image signal output from an imaging element including first and second pixel groups on which an object image that passes through first and second regions of an imaging lens and is pupil-divided is formed, and generates, on the basis of first and second images based on image signals output from the first and second pixel groups, a second display image that is used to check a focus and includes a first divided image which is a portion of a plurality of divided images obtained by dividing the first image in a predetermined division direction and a second divided image which is a portion of a plurality of divided images obtained by dividing the second image in the division direction and is arranged in a divided region other than a divided region corresponding to the first divided image;
suppressing the display of the first display image by the display unit and controlling the display unit such that the second display image is displayed; and
correcting distortion of the first display image caused by the imaging lens, corrects distortion of the second display image in the division direction, and does not correct the distortion of the second display image in a direction orthogonal to the division direction.

10. The image processing device according to claim 9, wherein the imaging lens is a zoom lens, and
the processor is further configured to perform correcting the distortion according to a focal length of the zoom lens.

11. The image processing device according to claim 9, wherein the processor is further configured to perform correcting the distortion according to an aperture value of the imaging lens.

12. The image processing device according to claim 9, further comprising:
a mount that is used to interchangeably mount any one of a plurality of the imaging lenses on a device body; and
wherein the processor is configured to perform
acquiring information indicating the type of imaging lens mounted by the mount, and
correcting the distortion according to the type of imaging lens indicated by the information.

13. The image processing device according to claim 9, further comprising:
a storage medium that stores conversion information related to coordinate conversion for correcting the distortion in advance,
wherein the processor is configured to perform correcting the distortion on the basis of the conversion information stored in the storage medium.

14. The image processing device according to claim 9, further comprising:
a storage medium that stores conversion information related to coordinate conversion for correcting the distortion of the first display image in advance; and
the processor further configured to perform
deriving second conversion information related to coordinate conversion for correcting the distortion of the second display image from the conversion information stored in the storage medium, and
correcting the distortion on the basis of the conversion information stored in the storage medium and the second conversion information.

15. An imaging device comprising:
the image processing device according to claim 1;
the imaging lens; and
the imaging element.

16. A non-transitory recording medium storing program that causes a computer to function as:
a generation unit that generates a first display image on the basis of an image signal output from an imaging element including first and second pixel groups on which an object image that passes through first and second regions of an imaging lens and is pupil-divided is formed, and generates, on the basis of first and second images based on image signals output from the first and second pixel groups, a second display image that is used to check a focus and includes a first divided image which is a portion of a plurality of divided images obtained by dividing the first image in a predetermined division direction and a second divided image which is a portion of a plurality of divided images obtained by dividing the second image in the division direction and is arranged in a divided region other than a divided region corresponding to the first divided image;
a display control unit that controls a display unit that displays an image such that the first display image generated by the generation unit is displayed and the second display image generated by the generation unit is displayed in a display region of the first display image; and
a correction unit that corrects distortion of the first display image caused by the imaging lens, corrects distortion of the second display image in the division direction, and does not correct the distortion of the second display image in a direction orthogonal to the division direction.

17. An image processing method comprising:

generating a first display image on the basis of an image signal output from an imaging element including first and second pixel groups on which an object image that passes through first and second regions of an imaging lens and is pupil-divided is formed, and generating, on the basis of first and second images based on image signals output from the first and second pixel groups, a second display image that is used to check a focus and includes a first divided image which is a portion of a plurality of divided images obtained by dividing the first image in a predetermined division direction and a second divided image which is a portion of a plurality of divided images obtained by dividing the second image in the division direction and is arranged in a divided region other than a divided region corresponding to the first divided image;

controlling a display unit that displays an image such that the first display image is displayed and the second display image is displayed in a display region of the first display image; and correcting distortion of the first display image caused by the imaging lens, correcting distortion of the second display image in the division direction, and not correcting distortion in a direction orthogonal to the division direction.

* * * * *